United States Patent
Kim et al.

(10) Patent No.: US 12,471,161 B2
(45) Date of Patent: Nov. 11, 2025

(54) ELECTRONIC DEVICE THAT CARRIES OUT COMMUNICATION AND OPERATION METHOD THEREFOR

(71) Applicant: Samsung Electronics Co., Ltd., Suwon-si (KR)

(72) Inventors: Misun Kim, Suwon-si (KR); Suhyun Kim, Suwon-si (KR); Junhwan An, Suwon-si (KR); Mingu Kang, Suwon-si (KR); Gyujin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 18/337,859

(22) Filed: Jun. 20, 2023

(65) Prior Publication Data

US 2023/0337302 A1    Oct. 19, 2023

Related U.S. Application Data

(63) Continuation of application No. PCT/KR2021/019962, filed on Dec. 27, 2021.

(30) Foreign Application Priority Data

Jan. 25, 2021 (KR) .................. 10-2021-0010488
Jun. 9, 2021 (KR) .................. 10-2021-0074674

(51) Int. Cl.
*H04W 76/14* (2018.01)
*H04W 76/30* (2018.01)
*H04M 1/72412* (2021.01)

(52) U.S. Cl.
CPC ........... *H04W 76/14* (2018.02); *H04W 76/30* (2018.02); *H04M 1/72412* (2021.01)

(58) Field of Classification Search
CPC ..... H04W 76/14; H04W 76/30; H04W 8/005; H04W 84/18; H04W 4/80; H04W 8/00; H04M 1/72412; H04M 1/6066
See application file for complete search history.

(56) References Cited

U.S. PATENT DOCUMENTS

2007/0255435 A1* 11/2007 Cohen ............... H04R 25/505
  700/94
2009/0061769 A1* 3/2009 Zimbric ............ H04M 1/72412
  455/41.2

(Continued)

FOREIGN PATENT DOCUMENTS

CN        111050306 A      4/2020
KR    10-2016-0009946 A    1/2016

(Continued)

OTHER PUBLICATIONS

Samsung; Galaxy Unpacked Official Replay; Jan. 14, 2021.

(Continued)

*Primary Examiner* — Ankur Jain
(74) *Attorney, Agent, or Firm* — Jefferson IP Law, LLP

(57) ABSTRACT

An electronic device that carries out communication and an operation method therefor are provided. The electronic device includes a short-range communication circuit and at least one processor operatively connected to the short-range communication circuit, wherein the at least one processor may be configured to establish a first communication connection to a first external electronic device via the short-range communication circuit, transmit, to a second external electronic device via the short-range communication circuit, first information associated with the first communication connection, if an event requiring a second communication connection between the second external electronic device and the first external electronic device occurs in the second external electronic device, receive, from the second external (Continued)

electronic device via the short-range communication circuit, second information notifying that the second communication connection will be established, and disestablish the first communication connection via the short-range communication circuit.

20 Claims, 14 Drawing Sheets

(56) References Cited

U.S. PATENT DOCUMENTS

| | | | | |
|---|---|---|---|---|
| 2013/0072119 A1* | 3/2013 | Park | ............... | H04W 12/50 |
| | | | | 455/41.2 |
| 2014/0370864 A1* | 12/2014 | Lin | ............... | H04M 3/42042 |
| | | | | 455/418 |
| 2015/0351142 A1* | 12/2015 | Seymour | ............... | H04R 25/554 |
| | | | | 455/41.3 |
| 2019/0394558 A1* | 12/2019 | Schobel | ............... | H04M 19/045 |
| 2020/0128620 A1* | 4/2020 | Han | ............... | H04W 4/20 |
| 2020/0244789 A1* | 7/2020 | Watson | ............... | H04W 4/80 |
| 2021/0068194 A1* | 3/2021 | Han | ............... | H04W 76/34 |
| 2021/0345081 A1* | 11/2021 | Li | ............... | H04W 4/80 |

FOREIGN PATENT DOCUMENTS

| | | |
|---|---|---|
| KR | 10-2017-0054922 A | 5/2017 |
| KR | 10-2019-0084584 A | 7/2019 |
| KR | 10-2020-0044505 A | 4/2020 |

OTHER PUBLICATIONS

Samsung; 3Types of 'Galaxy S21'. 'Buzz Pro'; Bikorea; Feb. 22, 2021.

International Search Report with Written Opinion and English translation dated Apr. 12, 2022; International Appln. No. PCT/KR2021/019962.

Korean Office Action dated Sep. 11, 2025, issued in Korean Application No. 10-2021-0074674.

* cited by examiner

ELECTRONIC DEVICE THAT CARRIES OUT COMMUNICATION AND OPERATION METHOD THEREFOR

CROSS-REFERENCE TO RELATED APPLICATION(S)

This application is a continuation application, claiming priority under § 365(c), of an International application No. PCT/KR2021/019962, filed on Dec. 27, 2021, which is based on and claims the benefit of a Korean patent application number 10-2021-0010488, filed on Jan. 25, 2021, in the Korean Intellectual Property Office, and of a Korean patent application number 10-2021-0074674, filed on Jun. 9, 2021, in the Korean Intellectual Property Office, the disclosure of each of which is incorporated by reference herein in its entirety.

BACKGROUND

1. Field

The disclosure relates to an electronic device performing communication and a method for operating the same.

2. Description of Related Art

An electronic device is capable of low-power and low-capacity data transmission or reception in a frequency band of about 2.4 gigahertz (GHz) using Bluetooth low energy (BLE) which is one of short-range communication schemes. Electronic devices using the BLE scheme may operate in an active mode only during a connection operation between the electronic devices and a data transmission or reception operation and may operate in a sleep mode during other times. Therefore, when the BLE scheme is used, power consumption of electronic devices may be reduced as compared to when a general Bluetooth scheme is used. Accordingly, the BLE scheme may be mainly used in electronic devices where power supply is limited, such as healthcare devices, sensor devices, or wearable electronic devices (e.g., BLE earphones, smart watches, or smart glasses).

Meanwhile, an electronic device using the BLE scheme may perform a device discovery and pairing process for communication with an external electronic device. The electronic device discovers and displays nearby external devices connectable via BLE through scanning, select one external electronic device among the displayed external devices, and request connection, and the external electronic device sends a signal responsive thereto. Thus, the electronic device and the external electronic device may be paired.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems or disadvantages and to provide at least the advantages described below. Accordingly, an aspect of the disclosure is to provide an electronic device, an external electronic device, and an operation method thereof, which enable the external electronic device connected to the electronic device to be connected to another external electronic device while the connection between the electronic device and the external electronic device is maintained in a short-range communication network.

Another aspect of the disclosure is to provide an electronic device and an operation method thereof, in which the electronic device performs connection with an external electronic device and transfers information related to the connection between the electronic device and the external electronic device to another external electronic device so that the external electronic device may connect to the other external electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a short-range communication circuit and at least one processor functionally connected with the short-range communication circuit. The at least one processor may be configured to perform a first communication connection with a first external electronic device through the short-range communication circuit, transmit first information associated with the first communication to a second external electronic device through the short-range communication circuit, when an event requiring a second communication connection between the second external electronic device and the first external electronic device occurs on the second external electronic device, receive second information indicating that the second communication connection is to be performed from the second external electronic device through the short-range communication circuit, and release the first communication connection through the short-range communication circuit.

In accordance with another aspect of the disclosure, an electronic device is provided. The electronic device includes a short-range communication circuit and at least one processor functionally connected with the short-range communication circuit. The at least one processor may be configured to perform a first communication connection with a first external electronic device through the short-range communication circuit, when an event requiring a second communication connection between the second external electronic device and the electronic device occurs on the second external electronic device in a state in which the first communication is connected, receive a request for the second communication connection from the second external electronic device through the short-range communication circuit, and release the first communication connection and perform the second communication connection through the short-range communication circuit based on the communication connection request.

In accordance with another aspect of the disclosure, an electronic device is provided. The electronic device includes a short-range communication circuit and at least one processor functionally connected with the short-range communication circuit. The at least one processor may be configured to receive first information associated with a first communication connection between a first external electronic device and a second external electronic device from the second external electronic device connected with the first external electronic device through the short-range communication circuit, when an event requiring a second communication connection to the first external electronic device occurs, transmit a request for releasing the first communication connection and a request for the second communication connection to the first external electronic device through the short-range communication circuit and transmit second information indicating that the second communication connection is to be performed to the second external electronic device, and perform the second communication connection based on the first information through the short-range communication circuit.

In the electronic device and operation method thereof according to various embodiments of the disclosure, the electronic device transmits connection information between the electronic device and an external electronic device to another external electronic device so that the external electronic device and the other external electronic device may connect to each other, allowing the external electronic device to automatically switch connection between the electronic device and the other external electronic device. Thus, the procedure for connection between electronic devices may be simplified. The simplified procedure may shorten the time for connection between electronic devices and increase usability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
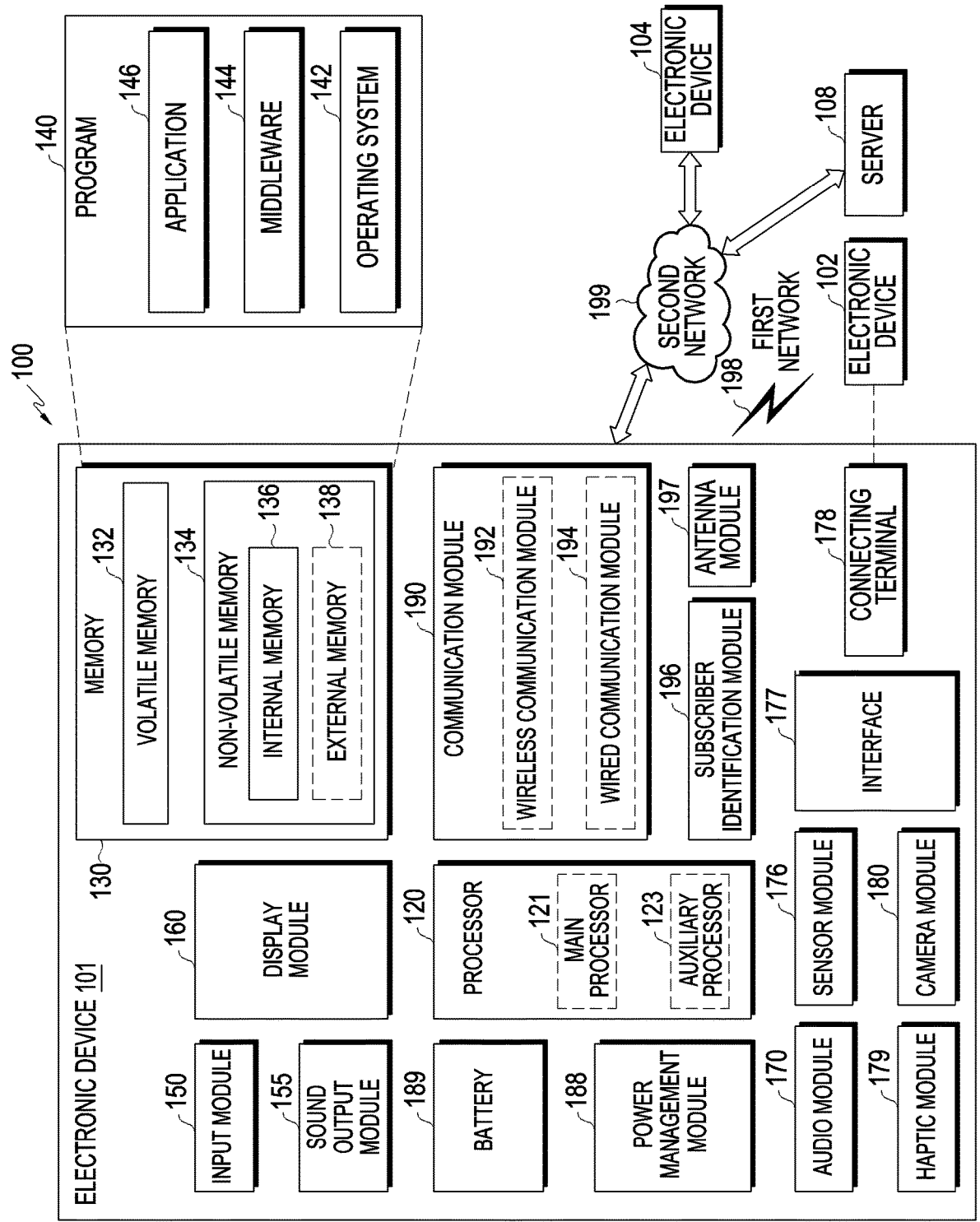
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In yet another embodiment, at least one (e.g., the connecting terminal 178) of the components may be omitted from the electronic device 101, or one or more other components may be added in the electronic device 101. According to a further embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to still another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to a further embodiment, the display 160 may include a touch sensor configured to detect a touch, or a pressure sensor configured to measure the intensity of a force generated by the touch.

The audio module 170 may convert a sound into an electrical signal and vice versa. According to still another embodiment, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to yet another embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to a further embodiment, the haptic module 179 may include, for example, a motor, a piezoelectric element, or an electric stimulator.

The camera module 180 may capture a still image or moving images. According to still another embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to a further embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to still another embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to another embodiment, other parts (e.g., radio frequency integrated circuit (RFIC)) than the radiator may be further formed as part of the antenna module 197.

According to various embodiments, the antenna module 197 may form a mmWave antenna module. According to yet another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to a further embodiment, instructions or data may be transmitted or received between the electronic device 101 and the external electronic device 104 via the server 108 coupled with the second network 199. The external electronic device 102 or the external electronic device 104 each may be a device of the same or a different type from the electronic device 101. According to still another embodiment, all or some of operations to be executed at the electronic device 101 may be executed at one or more of the external electronic device 102, the external electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning or a neural network. According to still another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of devices. The electronic devices may include, for example, a portable communication device (e.g., a smartphone), a computer device, a portable multimedia device, a portable medical device, a camera, a wearable device, or a home appliance. The electronic devices according to an embodiment are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to another embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to yet another embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The description of embodiments of the disclosure focuses primarily on Bluetooth low energy (BLE) communication scheme as a short-range communication scheme, but the subject matter of the disclosure may also be applicable to other short-range communication systems (e.g., Wi-Fi communication schemes) with a similar technical background, including general Bluetooth communication schemes, with minor changes made thereto without significantly departing from the scope of the disclosure, and this may be so performed by the determination of those skilled in the art to which the disclosure pertains.

Figure 2:
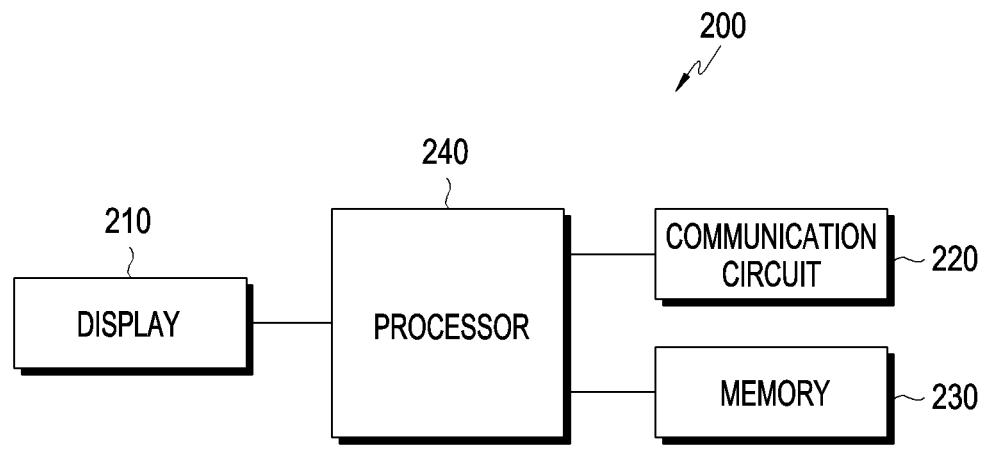
FIG. 2 is a block diagram illustrating an electronic device according to an embodiment of the disclosure.

FIG. 2 is a block diagram illustrating an electronic device according to an embodiment of the disclosure.

Referring to FIG. 2, in an embodiment, an electronic device 200 may include a display 210, a communication circuit 220, a memory 230, and a processor 240.

In another embodiment, under the control of the processor 240, the display 210 may visually display an operation of connecting and communicating with at least one external electronic device (e.g., the external electronic device 102) based on information generated by the processor 240, information transmitted or received through the communication circuit 220, or a configured communication scheme (e.g., BLE scheme). In yet another embodiment, the display 210 may be included in the display module 160 of FIG. 1.

In a further embodiment, the communication circuit 220 may communicate with an external electronic device based on the BLE scheme. In still another embodiment, the communication circuit 220 performs at least one of various operations for performing a short-range communication connection with a first external electronic device (not shown) or a second external electronic device (not shown) under the control of the processor 240, such as broadcasting an advertisement packet including connection information with the first external electronic device, receiving information broadcast by the first external electronic device or the second external electronic device, and a connection operation between electronic devices based on, e.g., Bluetooth profiles (e.g., a serial port profile (SPP), a hands-free profile (HFP), and an advanced audio distribution profile (A2DP)).

In an embodiment, the communication circuit 220 may be included in the communication module 190 of FIG. 1.

In another embodiment, the memory 230 may store the information transmitted or received by the communication circuit 220 and the information generated by the processor 240. According to various embodiments, the memory 230 may store information, commands, or indicators for connection with the first external electronic device or second external electronic device. According to various embodiments, the memory 230 may store account information about the electronic device 200, the first external electronic device, or the second external electronic device which have the same user account. In yet another embodiment, the same user account may include a variety of information, such as a personal account and a family account.

In a further embodiment, the memory 230 may include a volatile memory or a non-volatile memory, and may be included in the memory 130 of FIG. 1.

According to still another embodiment, the processor 240 may be included in the processor 120 of FIG. 1. In one embodiment, the processor 204 may include one or more processors.

In an embodiment, the processor 240 performs, through the communication circuit 220, at least one of various operations for performing a short-range communication connection with a first external electronic device (not shown) or a second external electronic device (not shown) under the control of the processor 240, such as broadcasting an advertisement packet including connection information with the first external electronic device, receiving information broadcast by the first external electronic device or the second external electronic device, and a connection operation between electronic devices based on, e.g., Bluetooth profiles (e.g., a serial port profile (SPP), a hands-free profile (HFP), and an advanced audio distribution profile (A2DP)).

In another embodiment, the processor 240 may control to perform wireless communication with a first external electronic device and a second external electronic device in a short range within a Bluetooth network according to the Bluetooth standard technology specified by the Bluetooth special interest group (SIG). The Bluetooth network may include, e.g., a Bluetooth legacy network and a BLE network. According to yet another embodiment, the electronic device 200 may perform wireless communication with the first external electronic device and the second external electronic device through at least one network of the Bluetooth legacy network and the BLE network.

In a further embodiment, the processor 240 may control to pre-recognize the first external electronic device and the second external electronic device or pre-store information (e.g., address information) about the first external electronic device and the second external electronic device.

According to still another embodiment, the processor 240 may transmit a data packet including content such as text, voice, or video to the first external electronic device and second external electronic device. At least one of the first external electronic device and second external electronic device, as well as the electronic device 200, may transmit the data packet depending on the type of the content included in the data packet. For example, when music plays on the electronic device 200, the electronic device 200 alone may transmit data packets. However, when a call is performed on the electronic device 200, at least one device of the first external electronic device and second external electronic device, as well as the electronic device 200, may also transmit a data packet including content (e.g., voice data).

According to an embodiment, the processor 240 may generate a link with each of the first external electronic device and second external electronic device for data packet transmission and broadcast connection information about the first external electronic device to the second external electronic device. In another embodiment, information broadcast by the electronic device 101 may include user account information about the electronic device 101 and the first external electronic device 102, auto-switchable device identifications (IDs) of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

According to yet another embodiment, when the electronic device 200 is a smartphone, and the second external electronic device is a tablet personal computer (PC), the processor 240 may control to perform the following operations.

According to a further embodiment, when the second external electronic device and the first external electronic device are connected as an event requiring connection with the first external electronic device is triggered on the second external electronic device while the electronic device 200 performs communication with the first external electronic device via a link, the communication connection between the electronic device 200 and the first external electronic device may be released, and the processor 240 may control to receive information indicating that a communication connection between the first external electronic device and the second external electronic device is established from the second external electronic device.

According to still another embodiment, when the first external electronic device supports multi-SPP connection, although the first external electronic device and the second external electronic device are connected, the processor 240 may control to maintain the SPP connection with the first external electronic device, thereby enabling fast future reconnection with the first external electronic device.

According to an embodiment, the processor 240 may control to display, on the screen, e.g., an icon or menu for requesting communication reconnection and connection change information (e.g., information indicating that the connection with the first external electronic device is released) between the electronic device 200 and the first external electronic device based on the information received from the first external electronic device.

According to another embodiment, when an event for requesting communication reconnection between the first external electronic device and the electronic device 200 is triggered via an input means of the electronic device 200, the processor 240 may control to perform operations for communication reconnection with the first external electronic device and broadcast information about the reconnection to the second external electronic device.

According to yet another embodiment, when the first external electronic device supports multi-SPP connection, since the SPP connection is maintained although the connection between the electronic device 200 and the first external electronic device is released, the processor 240 may control to perform the operation of connecting HFP or A2DP upon communication reconnection with the first external electronic device.

According to a further embodiment, when the electronic device 200 is a tablet PC, and the second external electronic device is a smartphone, the processor 240 may control to perform the following operations.

According to still another embodiment, when the first external electronic device and the second external electronic device are communicatively connected, the processor 240 may receive information related to connection between the first external electronic device and the second external electronic device from an external server or the second external electronic device.

According to an embodiment, when an event requiring connection with the first external electronic device is triggered on the electronic device 200 while the second external electronic device performs communication with the first external electronic device via a link, the processor 240 may identify the connection state between the second external electronic device and the first external electronic device based on information pre-received from the second external electronic device and determine whether communication connection with the first external electronic device 102 may be performed based on the identified connection state.

According to another embodiment, upon determining that communication connection with the first external electronic device 102 is possible, the processor 240 may request the first external electronic device to release the communication connection with the first external electronic device and receive a response signal thereto, thereby establishing a communication connection with the first external electronic device.

According to yet another embodiment, the processor 240 may control to transmit information indicating that the communication connection has been established between the electronic device 200 and the second external electronic device to the first external electronic device. According to a further embodiment, when the first external electronic device supports multi-SPP connection, the processor 240 may establish an SPP connection with the first external electronic device in a state in which the first external electronic device and second external electronic device are connected, thereby enabling fast connection to the first external electronic device when an event requiring connection with the first external electronic device in the future occurs.

According to still another embodiment, when the communication reconnection between the second external electronic device and the first external electronic device is performed, the processor 240 may control to release connection with the first external electronic device and receive information about reconnection from the second external electronic device. According to an embodiment, the processor 240 may control to display information indicating that the connection with the first external electronic device has been released on the screen.

According to another embodiment, when the first external electronic device supports multi-SPP connection, since the SPP connection is maintained although the connection between the electronic device 200 and the first external electronic device is released by communication reconnection between the second external electronic device and the first external electronic device, the processor 240 may control to perform the operation of connecting HFP or A2DP upon communication reconnection with the first external electronic device.

Figure 3:
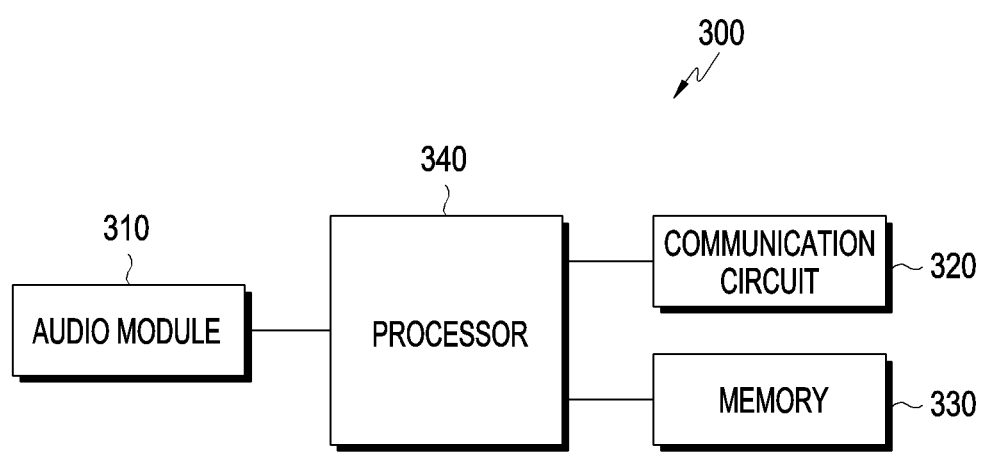
FIG. 3 is a block diagram illustrating a first external electronic device according to an embodiment of the disclosure.

FIG. 3 is a block diagram illustrating a first external electronic device according to an embodiment of the disclosure. In an embodiment, a first external electronic device may be an audio device (e.g., a Bluetooth earphone) and may be an external electronic device wirelessly connected to the electronic device of FIG. 1.

Referring to FIG. 3, in an embodiment, the first external electronic device 300 may include an audio module 310, a communication circuit 320, a memory 330, or a processor 340.

In another embodiment, the audio module 310 may convert a sound into an electrical signal or convert an electrical signal into a sound under the control of the processor 340. According to yet another embodiment, the audio module 310 may include an input module and an output module. According to a further embodiment, the audio module 310 may obtain a sound through the input module and transfer the sound to an electronic device (e.g., the electronic device 101) wirelessly connected, and may obtain a sound through the wirelessly connected electronic device (e.g., the electronic device 101) and output the sound through the output module.

In still another embodiment, the communication circuit 320 may communicate with an external electronic device 320 based on the BLE scheme. In an embodiment, the communication circuit 320 performs at least one of various operations for performing a short-range communication connection with an electronic device (not shown) or a second external electronic device (not shown) under the control of the processor 340, such as broadcasting an advertisement packet including connection information with the first external electronic device, receiving information broadcast by the first external electronic device or the second external electronic device, and a connection operation between electronic devices based on, e.g., Bluetooth profiles (e.g., a serial port profile (SPP), a hands-free profile (HFP), and an advanced audio distribution profile (A2DP)).

In another embodiment, the memory 330 may store the information transmitted or received by the communication circuit 320 and the information generated by the processor 340. According to various embodiments, the memory 330 may store information, commands, or indicators for connection with the electronic device or second external electronic device. According to various embodiments, the memory 330 may store account information about the electronic device 101, the first external electronic device 300, or the second external electronic device which have the same user account.

In yet another embodiment, the memory 330 may include a volatile memory or a non-volatile memory.

In a further embodiment, the processor 340 performs, through the communication circuit 320, at least one of various operations for performing a short-range communication connection with an electronic device (not shown) or a second external electronic device (not shown) under the control of the processor 240, such as broadcasting an advertisement packet including connection information with the first external electronic device, receiving information broadcast by the first external electronic device or the second external electronic device, and a connection operation between electronic devices based on, e.g., Bluetooth profiles (e.g., a serial port profile (SPP), a hands-free profile (HFP), and an advanced audio distribution profile (A2DP)).

According to still another embodiment, the processor 340 may perform a communication connection based on a Bluetooth communication scheme with the electronic device 200 and the second external electronic device as it performs various operations for Bluetooth connection. In an embodiment, the processor 340 may control to connect to the electronic device 200 and the second external electronic device through SPP, HFP or A2DP.

According to another embodiment, when the first external electronic device 300 supports multi-SPP connection, the processor 340 may perform an SPP connection between the first external electronic device 300 and the second external electronic device based on a request from the second external electronic device in a state of being communicatively connected with the electronic device.

According to yet another embodiment, when an event requiring connection with the first external electronic device 300 is triggered on the second external electronic device, the processor 340 may receive a request for connection between the first external electronic device 300 and the second external electronic device and a request for releasing connection between the first external electronic device 300 and the electronic device 200 from the second external electronic device. According to a further embodiment, since an SPP connection has already been established between the first external electronic device 300 and the second external electronic device when the first external electronic device 300 supports multi-SPP connection, the processor 340 may receive an HFP or A2DP connection request between the first external electronic device 300 and the second external electronic device and an HFP or A2DP connection release request between the first external electronic device 300 and the electronic device 200 from the second external electronic device.

According to an embodiment, the processor 340 may release the connection with the electronic device and perform connection with the second external electronic device. According to another embodiment, when the first external electronic device 300 supports multi-SPP connection, the processor 340 may control to maintain the SPP connection although the connection with the electronic device is released.

In yet another embodiment, an event for requesting reconnection between the first external electronic device 300 and the electronic device may be triggered via an input means of the electronic device, the processor 340 may perform operations for reconnection with the electronic device. According to a further embodiment, when the first external electronic device 300 supports multi-SPP connection, the processor 340 may control to perform HFP or A2DC reconnection since the SPP connection with the electronic device is maintained.

According to various embodiments of the disclosure, an electronic device (e.g., the electronic device 101) may comprise a short-range communication circuit (e.g., the second communication circuit 220) and at least one processor (e.g., the processor 240) functionally connected with the short-range communication circuit. The at least one processor may be configured to perform a first communication connection with a first external electronic device (e.g., the first external electronic device 102) through the short-range communication circuit, transmit first information associated with the first communication to a second external electronic device (e.g., the second external electronic device 103) through the short-range communication circuit, when an event requiring a second communication connection between the second external electronic device and the first external electronic device occurs on the second external electronic device, receive second information indicating that the second communication connection is to be performed from the second external electronic device through the short-range communication circuit, and release the first communication connection through the short-range communication circuit.

In various embodiments, the at least one processor may be configured to receive information indicating that the second communication connection is complete from the second external electronic device through the short-range communication circuit after the first communication connection is released.

In various embodiments, the at least one processor may be configured to display, on a display of the electronic device, information indicating release of the first communication connection or information indicating that the second communication connection is complete or a menu for requesting reconnection of the first communication after the first communication connection is released.

In various embodiments, the at least one processor may be configured to perform the first communication connection through the short-range communication circuit based on connections of at least two profiles and release the first communication connection by releasing a connection of at least one profile among the at least two profiles through the short-range communication circuit.

In various embodiments, the at least two profiles may include a serial port profile (SPP) and at least one of a hands free profile (HFP) or an advanced audio distribution profile (A2DP), and the at least one profile may include at least one of the HFP or the A2DP.

In various embodiments, the first information may be transmitted to the second external electronic device through an external server and may include state information about the electronic device, state information about the first external electronic device, and identification information about the first external electronic device.

In various embodiments, the electronic device, the first external electronic device, and the second external electronic device may be registered using the same user account.

According to various embodiments of the disclosure, an electronic device (e.g., the first external electronic device 102) may comprise a short-range communication circuit (e.g., the short-range communication circuit 320) and at least one processor (e.g., the processor 340) functionally connected with the short-range communication circuit. The at least one processor may be configured to perform a first communication connection with a first external electronic device (e.g., the electronic device 101) through the short-range communication circuit, when an event requiring a second communication connection between a second external electronic device (e.g., the second external electronic device 103) and the electronic device occurs on the second external electronic device in a state in which the first communication is connected, receive a request for the second communication connection from the second external electronic device through the short-range communication circuit, and release the first communication connection and perform the second communication connection through the short-range communication circuit based on the communication connection request.

In various embodiments, the at least one processor may be configured to perform the first communication connection through the short-range communication circuit based on connections of at least two profiles and release the first communication connection by releasing a connection of at least one profile among the at least two profiles through the short-range communication circuit.

In various embodiments, the at least one processor may be configured to perform a connection of one profile among the at least two profiles between the second external electronic device and the electronic device based on a request from the second external electronic device before the event occurs, in a state in which the first communication is connected.

In various embodiments, the at least two profiles may include a serial port profile (SPP) and at least one of a hands free profile (HFP) or an advanced audio distribution profile (A2DP), and the at least one profile may include at least one of the HFP or the A2DP, and the one profile may be the SPP.

In various embodiments, the at least one processor may be configured to transmit state information about the electronic device and identification information about the electronic device to the first external electronic device when performing the first communication connection through the short-range communication circuit.

In various embodiments, the at least one processor may be configured to receive a request for releasing the second communication connection, along with the request for the second communication connection, from the second external electronic device through the short-range communication circuit.

In various embodiments, the electronic device, the first external electronic device, and the second external electronic device may be registered using the same user account.

According to various embodiments of the disclosure, an electronic device (e.g., the second external electronic device 103) may comprise a short-range communication circuit (e.g., the short-range communication circuit 220) and at least one processor (e.g., the processor 240) functionally connected with the short-range communication circuit. The at least one processor may be configured to receive first information associated with a first communication connection between a first external electronic device (e.g., the first external electronic device 102) and a second external electronic device (e.g., the electronic device 101) from the second external electronic device connected with the first external electronic device through the short-range communication circuit, when an event requiring a second communication connection to the first external electronic device occurs, transmit a request for releasing the first communication connection and a request for the second communication connection to the first external electronic device through the short-range communication circuit and transmit second information indicating that the second communication connection is to be performed to the second external electronic device, and perform the second communication connection based on the first information through the short-range communication circuit.

In various embodiments, the at least one processor may be configured to transmit information indicating that the second communication connection is complete from the second external electronic device through the short-range communication circuit after the second communication connection is complete.

In various embodiments, the first information may be received from the second external electronic device through an external server and may include state information about the second external electronic device, state information about the first external electronic device, and identification information about the first external electronic device.

In various embodiments, the first communication connection may be performed based on at least two profiles. In the release of the first communication connection, connection of at least one profile among the at least two profiles may be released. The at least one processor may be configured to request the first external electronic device to perform a connection of one profile among the at least two profiles between the first external electronic device and the electronic device through the short-range communication circuit before the event occurs in a state in which the first communication is connected.

In various embodiments, the at least two profiles may include a serial port profile (SPP) and at least one of a hands free profile (HFP) or an advanced audio distribution profile (A2DP), and the at least one profile may include at least one of the HFP or the A2DP, and the one profile may be the SPP.

In various embodiments, the electronic device, the first external electronic device, and the second external electronic device may be registered using the same user account.

Figure 4A:
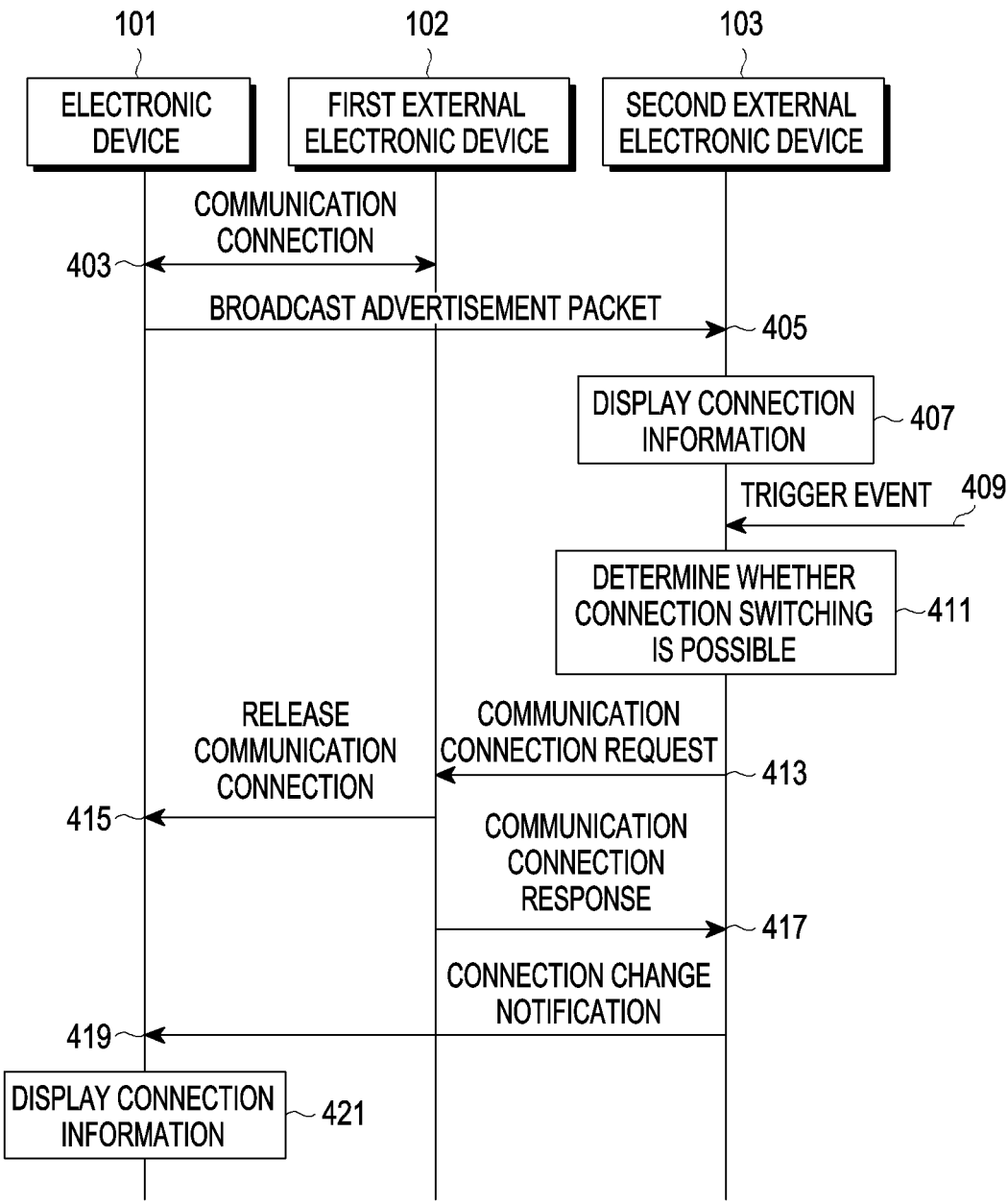
FIG. 4A is a view illustrating a short-range communication connection procedure between an electronic device and first and second external electronic devices according to an embodiment of the disclosure.

FIG. 4A is a view illustrating a short-range communication connection procedure between an electronic device and first and second external electronic devices according to an embodiment of the disclosure.

In an embodiment, the electronic device 101 or the second external electronic device 103 may be substantially the same as the electronic device 101 of FIG. 1 or the electronic device 200 of FIG. 2. In another embodiment, the first external electronic device 102 may be the same type of electronic device as the external electronic device 300 of FIG. 3. In yet another embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In a further embodiment, when the first external electronic device 102 is a pair of Bluetooth earphones separable from each other, the user may be wearing at least one earphone. In other words, one earphone is connected to the electronic device 101 while the other earphone is disconnected from the electronic device 101, or both the earphones may be connected to the electronic device 101. In an embodiment, the electronic device 101, the first external electronic device 102, and the second external electronic device 103 are in a state in which the Bluetooth function is enabled, and may be devices registered with an electronic device (e.g., server) using the same user account. In an embodiment, the electronic device 101, the first external electronic device 102, and the second external electronic device 103 may be in a state in which the function of automatically switching communication connection between a plurality of electronic devices is enabled.

Figure 4B:
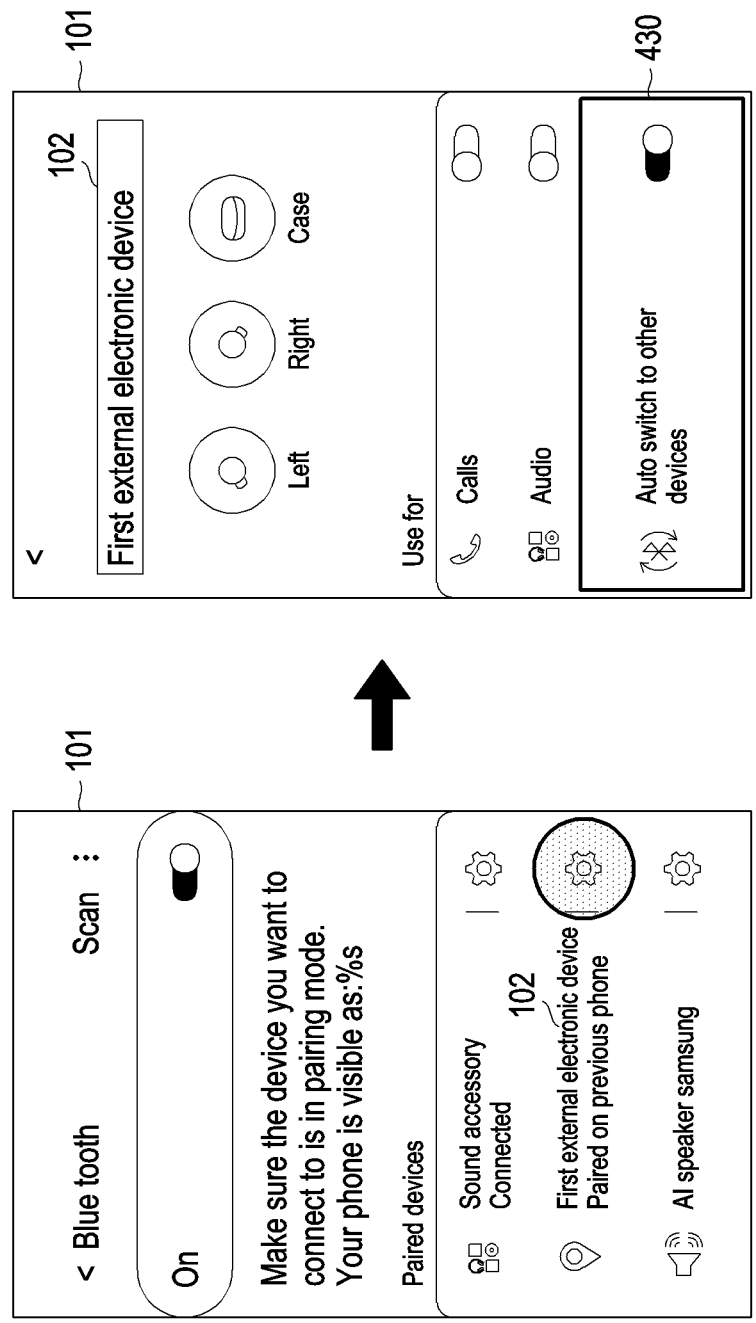
FIG. 4B is a view illustrating an example in which an electronic device activates an automatic switching function of a first external electronic device according to an embodiment of the disclosure.

FIG. 4B is a view illustrating an example in which a function 430 to allow a first external electronic device 102 registered with the electronic device 101 to automatically switch communication connection with a plurality of electronic devices is enabled through a Bluetooth setting function of the electronic device 101 according to an embodiment of the disclosure.

Referring to FIG. 4A, in operation 403, the electronic device 101 may perform various operations for Bluetooth connection based on the Bluetooth standard, performing communication connection with the first external electronic device 102 based on the Bluetooth communication scheme. According to an embodiment, upon receiving an input signal for scanning nearby Bluetooth devices through the input means of the electronic device 101 in a state in which the Bluetooth function of the electronic device 101 and the first external electronic device 102 is enabled, the electronic device 101 may transmit an ID packet, and the first external electronic device 102 may receive the ID packet so that the electronic device 101 may recognize the first external electronic device 102. When the recognized first external electronic device 102 is displayed on the display of the electronic device 101, and the recognized first external electronic device 102 is selected through the input means of the electronic device 101, the pairing between the electronic device 101 and the first external electronic device 102 may be finally complete.

In an embodiment, for Bluetooth communication, the electronic device 101, the first external electronic device 102, and the second external electronic device 103 may be compatible with Bluetooth profiles required to use a desired service. In an embodiment, the electronic device 101 and the second external electronic device 103 each may connect to the first external electronic device 102 using at least one of a serial port profile (SPP), a hands free profile (HFP), or an advanced audio distribution profile (A2DP) among Bluetooth profiles. The SPP, HFP, or A2DP connection process may follow the Bluetooth profile standard.

In an embodiment, the electronic device 101 may configure a virtual serial port between the first external electronic device 102 and the electronic device 101 or between the first external electronic device 102 and the second external electronic device 103 based on the SPP.

In an embodiment, the HFP may transmit a mono audio channel using a synchronous connection oriented (SCO) link and provide hands-free services, such as last number redial, put a call on hold, and voice dialing, as well as headset services.

In an embodiment, the A2DP may define a method for streaming multimedia audio from the electronic device 101 to the first external electronic device 102 or from the second external electronic device 103 to the first external electronic device 102 through Bluetooth connection.

In an embodiment, if the Bluetooth communication is connected between the first external electronic device 102 and the electronic device 101 or between the first external electronic device 102 and the second external electronic device 103, they may be connected through the SPP or additionally HFP or A2DP.

In an embodiment, the electronic device 101 may receive SPP connection information and wearing state information about the first external electronic device 102 after communication connection with the first external electronic device 102. According to an embodiment, the SPP connection information and wearing state information about the first external electronic device 102 may be received based on a pre-defined universal unique identifier (UUID).

In operation 405, the electronic device 101 may broadcast an advertisement packet including connection information about the first external electronic device 102 in a state of being connected to the first external electronic device 102, transferring connection information with the first external electronic device 102 to the second external electronic device 103. In an embodiment, the connection information may be encrypted based on a hash function. The hash function may change at a specific period of time.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 based on the UUID while performing communication connection with the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server.

In another embodiment, the electronic device 101 may transmit the user account information, ID, connection state, and state information of the first external electronic device 102 to the second external electronic device 103 based on a device-to-device (D2D) communication scheme or a Wi-Fi communication scheme.

In operation 407, the second external electronic device 103 may display, on the display, information indicating that the electronic device 101 and the first external electronic device 102 have been connected based on the connection information about the first external electronic device 102 received from the electronic device 101 or the external server. In an embodiment, the second external electronic device 103 may display, on the display, information indicating that the electronic device 101 and the first external electronic device 102 have been connected based on the user account information registered in the server.

In operation 409, when an event requiring connection with the first external electronic device 102 is triggered on the second external electronic device 103, in operation 411, the second external electronic device 103 may identify the connection state between the electronic device 101 and the first external electronic device 102 based on the information received from the electronic device 101 in operation 405 and determine whether it is possible to perform communication connection with the first external electronic device 102 based on the identified connection state.

In an embodiment, the event requiring connection with the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In an embodiment, upon identifying that the electronic device 101 is performing a call using the first external electronic device 102, is executing an application using the microphone built in the first external electronic device 102, or the first external electronic device 102 is outputting audio, the second external electronic device 103 may determine that communication connection with the first external electronic device 102 may not be performed. Table 1 below shows a connection operation between the second external electronic device 103 and the first external electronic device 102 when an event requiring connection with the first external electronic device 102 is triggered on the second external electronic device 103, in each situation according to an embodiment. The operations of Table 1 are settings for stably performing connection operation between the second external electronic device 103 and the first external electronic device 102, and such settings may be changed as necessary.

TABLE 1

| Situation | Connection operation | Description |
| --- | --- | --- |
| When another external electronic device (e.g., Bluetooth earphone) of the same type of first external electronic device 102 is simultaneously connected to electronic device 101, and all have their automatic connection first enabled | Not connectable | Second external electronic device 103 may not identify whether the device supposed to perform connection (i.e., the Bluetooth earphone worn by user) is first external electronic device 102 or the other external electronic device |
| When there are two electronic devices each connected to the external electronic device (e.g., Bluetooth earphone) within Bluetooth communication-capable range | Not connectable | Second external electronic device 103 may not distinguish between electronic device 101 and first external electronic device 102 |
| When second external electronic device 103 is connected to another external electronic device (e.g., Bluetooth speaker or USB earphone) | Not connectable | Since second external electronic device 103 is already connected to audio output device, it does not connect to first external electronic device 102 |
| When second external electronic device 103 is using the mirroring function | Not connectable | Second external electronic device 103 is in the state of being connected to another electronic device via Bluetooth |
| When second external electronic device 103 is performing music sharing operation | Not connectable | Second external electronic device 103 is in the state of being connected to another electronic device via Bluetooth |
| When second external electronic device 103 has the call and message continuity (CMC) enabled | Partially connectable | When ringtone sounds, first external electronic device 102 maintains connection with electronic device 101 (i.e., second external electronic device 103 and first external electronic device 102 not connected to each other). When user receives incoming call on second external electronic device 103, electronic device |

TABLE 1-continued

| Situation | Connection operation | Description |
| --- | --- | --- |
| | | 101 and first external electronic device 102 are disconnected, and second external electronic device 103 and first external electronic device 102 are connected |
| When electronic device 101 and second external electronic device 103 are using voice on IP (VoIP) using same Internet protocol (IP) address | Not connectable | Ringtone sounds on both electronic device 101 and second external electronic device 103. However, as it is not known which one first sounds off the ringtone, auto switching function is not supported |
| When first external electronic device 102 is a pair of earphones separable for both ears, and user wears only one of the earphones | Connectable | Although user wears only at least one of the pair of earphones separable for both ears, the earphones are determined to be worn, so that auto connection switching operation is performed |
| When a plurality of applications using the audio function on second external electronic device 103 are configured to use different output devices, respectively | Partially connectable | Only when the output device of the application is set as a Bluetooth device, auto connection switching operation is performed |

In an embodiment, the second external electronic device 103 may display, on the display of the second external electronic device 103, information indicating the result of determining that communication connection with the first external electronic device 102 may not be performed.

In an embodiment, upon identifying that the electronic device 101 is playing media through a media application using the first external electronic device 102 and the electronic device 101 is connected to the first external electronic device 102 but is in an idle state, the second external electronic device 103 may determine that communication connection with the first external electronic device 102 may be performed.

In operation 413, the second external electronic device 103, which determines that communication connection with the first external electronic device 102 may be performed, may send a request for communication connection to the first external electronic device 102. In an embodiment, the second external electronic device 103 may send a request for SPP, HFP, or A2DP connection to the first external electronic device 102. In an embodiment, the second external electronic device 103, which determines that communication connection with the first external electronic device 102 may be performed, may notify the first external electronic device 102 to release connection with the electronic device 101. In an embodiment, the second external electronic device 103, which determines that communication connection with the first external electronic device 102 may be performed, may notify the electronic device 101 that connection between the second external electronic device 103 and the first external electronic device 102 is to be performed.

In operation 413, the first external electronic device 102, which receives a communication connection request from the second external electronic device 103, may release the communication connection with the electronic device 101 in operation 415. According to an embodiment, the first external electronic device 102 may perform communication connection with the second external electronic device 103 using the at least one of SPP, HFP, or A2DP and release the SPP, HFP, or A2DP connection with the electronic device 101.

In operation 417, the first external electronic device 102 may transmit a communication connection response to the second external electronic device 103 so that a communication connection may be established between the first external electronic device 102 and the second external electronic device 103. According to an embodiment, the first external electronic device 102 may notify the second external electronic device 103 that the SPP, HFP, or A2DP connection with the first external electronic device 102 has been established through the communication connection response.

In operation 419, the second external electronic device 103 may notify the electronic device 101 that the communication connection between the second external electronic device 103 and the first external electronic device 102 has been complete. According to an embodiment, the second external electronic device 103 may notify the electronic device 101 that an SPP, HFP, or A2DP connection with the first external electronic device 102 has been established.

In operation 421, in operation 419, the electronic device 101 may display, on the display, information indicating that the connection state of the first external electronic device 102 has been changed based on the information received from the second external electronic device 103 in operation 419. According to an embodiment, when the second external electronic device 103 establishes an SPP and HFP or A2DP connection with the first external electronic device 102, the electronic device 101 may display, on the display, information indicating that the connection with the first external electronic device 102 has been released.

In an embodiment, the electronic device 101 may display, on the display, the reason why the connection of the first external electronic device 102 has been changed (e.g., occurrence of an incoming/outgoing call on the second external electronic device 103 or execution of a media application on the second external electronic device 103), as the information indicating that the connection state has been changed.

In an embodiment, in a case where the electronic device 101 is playing media through the media application using the first external electronic device 102, if media is played through the media application by a user input on the second external electronic device 103, a voice recognition artificial intelligence application such as a voice assistance is played or an incoming/outgoing call is generated on the second external electronic device 103 so that the connection between the electronic device 101 and the first external electronic device 102 is released, and a connection between the first external electronic device 102 and the second external electronic device 103 is performed, the media playback on the electronic device 101 may be switched into a pause state and, if the media playback on the second external electronic device 103 or the voice recognition artificial intelligence application is terminated or incoming/outgoing call is terminated, the connection between the first external electronic device 102 and the second external electronic device 103 may be released, and communication may be reconnected between the electronic device 101 and the first external electronic device 102. In an embodiment, when the connection between the first external electronic device 102 and the second external electronic device 103 is released and the communication is reconnected between the electronic device 101 and the first external electronic device 102, media playback that has been paused on the electronic device 101 immediately before the connection between the first external electronic device 102 and the electronic device 101 is released may be re-executed.

Figure 5:
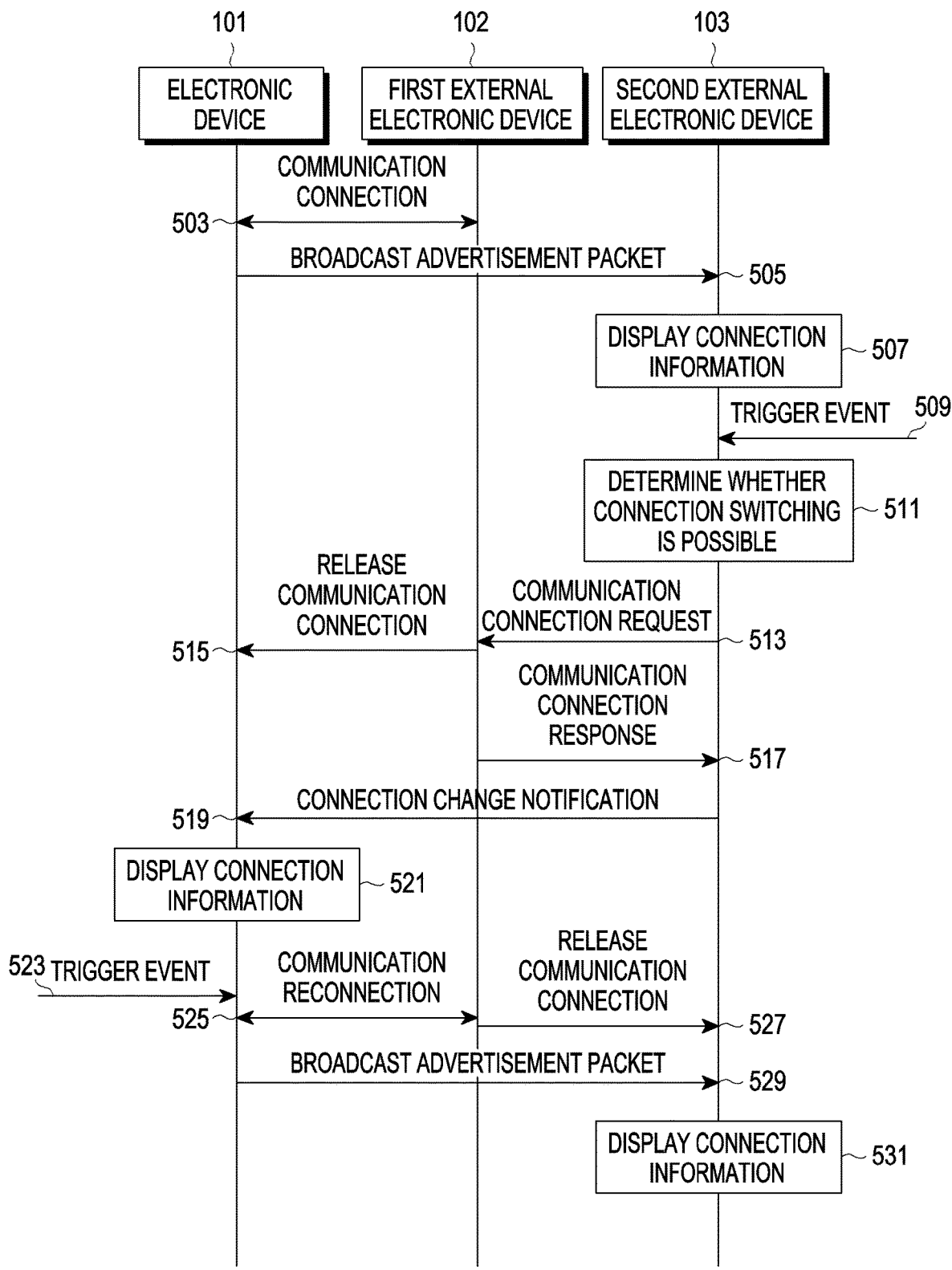
FIG. 5 is a view illustrating a short-range communication connection procedure between an electronic device and first and second external electronic devices according to an embodiment of the disclosure.

FIG. 5 is a view illustrating a short-range communication connection procedure between an electronic device and first and second external electronic devices according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled.

Operations 503, 505, 507, 509, 511, 513, 515, 517, 519, and 521 of FIG. 5 are identical to operations 403, 405, 407, 409, 411, 413, 415, 417, 419, and 421 of FIG. 4A and, thus, no repetitive description is given below. In the state in which the connection between the electronic device 101 and the first external electronic device 102 is released and the connection between the first external electronic device 102 and the second external electronic device 103 is established through operations 503, 505, 507, 509, 511, 513, 515, 517, 519, and 521, when an event for requesting communication reconnection between the first external electronic device 102 and the electronic device 101 is triggered through the input means of the electronic device 101 in operation 523, the electronic device 101 may perform various operations for communication reconnection with the first external electronic device 102 in operation 525.

In an embodiment, the event requiring reconnection with the first external electronic device 102 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, the electronic device 101 may perform communication reconnection by touching an icon or a menu for requesting communication reconnection with the first external electronic device 102 displayed on the screen of the electronic device 101.

In an embodiment, when the second external electronic device 103 is performing a call using the first external electronic device 102, the electronic device 101 may be configured not to perform communication reconnection even when the icon or menu for requesting communication reconnection with the first external electronic device 102 displayed on the screen of the electronic device 101 is touched.

A connection operation between the second external electronic device 103 and the first external electronic device 102 when an event requiring connection with the first external electronic device 102 is triggered on the second external electronic device 103 in each of various situations according to an embodiment may be performed based on Table 1.

In operation 527, the first external electronic device 102 reconnected with the electronic device 101 may release the communication connection with the second external electronic device 103. According to an embodiment, the electronic device 101 may display information indicating reconnection with the first external electronic device 102 on the display.

In operation 529, like in operation 505, the electronic device 101 may broadcast an advertisement packet including reconnection information in a state of being reconnected to the first external electronic device 102, transferring reconnection information with the first external electronic device 102 to the second external electronic device 103. In an embodiment, the connection information may be encrypted based on a hash function. The hash function may change at a specific period of time.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server. In another embodiment, the electronic device 101 may transmit the user account information, ID, connection state, and state information of the first external electronic device 102 to the second external electronic device 103 based on a D2D communication scheme or a Wi-Fi communication scheme.

In operation 531, like in operation 507, the second external electronic device 103 may display, on the display, information indicating that the electronic device 101 and the first external electronic device 102 have been reconnected based on the connection information about the first external electronic device 102 received from the electronic device 101 or the external server.

Thereafter, when an event requesting connection with the first external electronic device 102 reoccurs on the second external electronic device 103 or the electronic device 101, operations 509 to 521 or operations 523 to 531 may be performed.

In an embodiment, in a case where the electronic device 101 is playing media through the media application using the first external electronic device 102, if the media application is executed by a user input on the second external electronic device 103, a voice recognition artificial intelligence application such as a voice assistance is played or an incoming/outgoing call is generated on the second external electronic device 103 so that the connection between the electronic device 101 and the first external electronic device 102 is released, and a connection between the first external electronic device 102 and the second external electronic device 103 is performed, the media playback on the electronic device 101 may be switched into a pause state and, if the media playback on the second external electronic device 103 or the voice recognition artificial intelligence application is terminated or incoming/outgoing call is terminated, the connection between the first external electronic device 102 and the second external electronic device 103 may be released, and communication may be reconnected between the electronic device 101 and the first external electronic device 102. In an embodiment, when the connection between the first external electronic device 102 and the second external electronic device 103 is released and the communication is reconnected between the electronic device 101 and the first external electronic device 102, media playback that has been paused on the electronic device 101 immediately before the connection between the first external electronic device 102 and the electronic device 101 is released may be re-executed.

Figure 6:
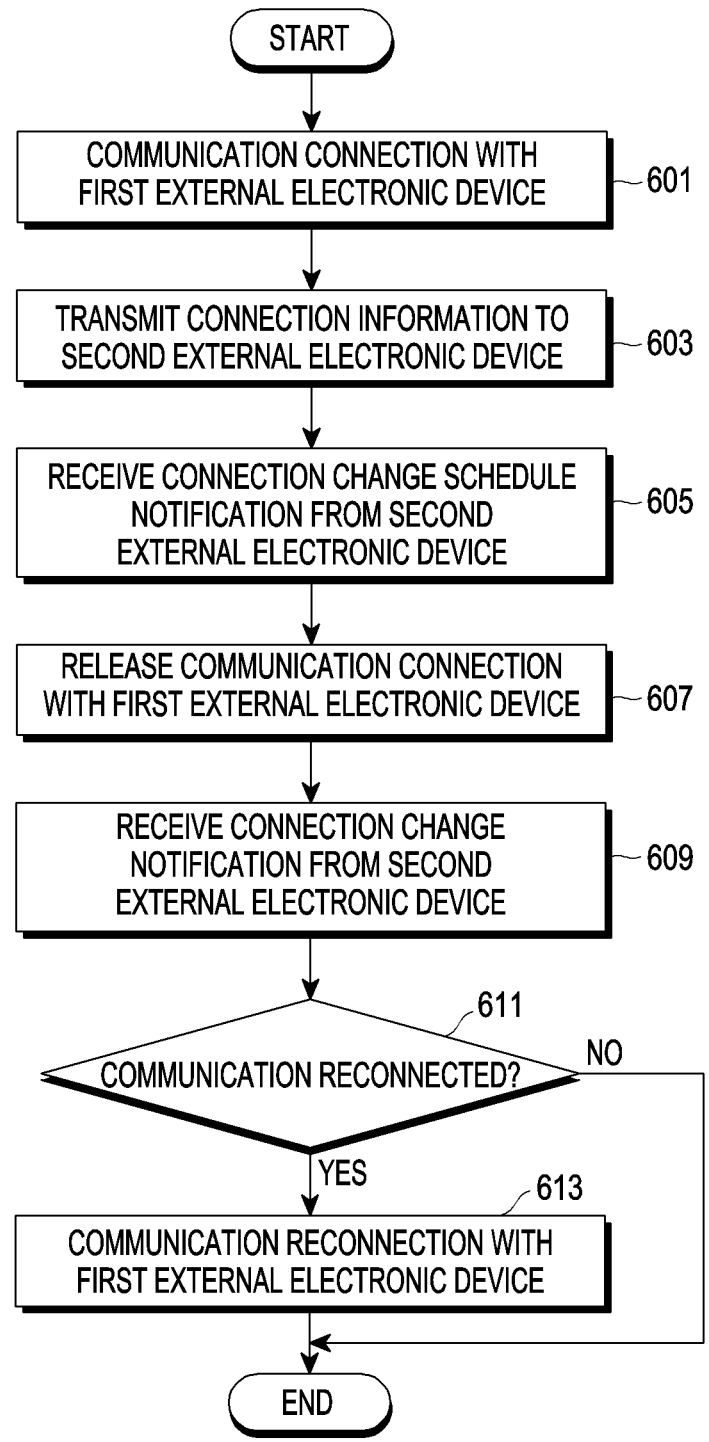
FIG. 6 is a flowchart illustrating an operation for an electronic device performing a short-range communication connection with a first external electronic device and a second external electronic device according to an embodiment of the disclosure.

FIG. 6 is a flowchart illustrating an operation for an electronic device performing a short-range communication connection with a first external electronic device and a second external electronic device according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled.

Referring to FIG. 6, in operation 601, the electronic device 101 may perform various operations for Bluetooth connection based on the Bluetooth standard, performing communication connection with the first external electronic device 102 based on the Bluetooth communication scheme. According to an embodiment, upon receiving an input signal for scanning nearby Bluetooth devices through the input means of the electronic device 101 in a state in which the Bluetooth function of the electronic device 101 and the first external electronic device 102 is enabled, the electronic device 101 may transmit an ID packet, and the first external electronic device 102 may receive the ID packet so that the electronic device 101 may recognize the first external electronic device 102. When the recognized first external electronic device 102 is displayed on the display of the electronic device 101, and the recognized first external electronic device 102 is selected through the input means of the electronic device 101, the pairing between the electronic device 101 and the first external electronic device 102 may be finally complete.

In an embodiment, for Bluetooth communication, the electronic device 101, the first external electronic device 102, and the second external electronic device 103 may be compatible with Bluetooth profiles required to use a desired service. In an embodiment, the electronic device 101 and the second external electronic device 103 each may connect to the first external electronic device 102 using at least one of an SPP, an HFP, or an A2DP among Bluetooth profiles. The SPP, HFP, or A2DP connection process may follow the Bluetooth profile standard. In an embodiment, if the Bluetooth communication is connected between the first external electronic device 102 and the electronic device 101 or between the first external electronic device 102 and the second external electronic device 103, they may be connected through the SPP or additionally HFP or A2DP.

In an embodiment, the electronic device 101 may receive SPP connection information and wearing state information about the first external electronic device 102 after communication connection with the first external electronic device 102. According to an embodiment, the SPP connection information and wearing state information about the first external electronic device 102 may be received based on a pre-defined UUID.

In operation 603, the electronic device 101 may broadcast an advertisement packet including connection information about the first external electronic device 102 in a state of being connected to the first external electronic device 102, transferring connection information with the first external electronic device 102 to the second external electronic device 103. In an embodiment, the connection information may be encrypted based on a hash function. The hash function may change at a specific period of time.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 based on the UUID while performing communication connection with the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server. In another embodiment, the electronic device 101 may transmit the user account information, ID, connection state, and state information of the first external electronic device 102 to the second external electronic device 103 based on a D2D communication scheme or a Wi-Fi communication scheme.

When an event requiring connection with the first external electronic device 102 is triggered on the second external electronic device 103, in operation 605, the electronic device 101 may receive a notification indicating that connection between the second external electronic device 103 and the first external electronic device 102 is to be performed from the second external electronic device 103.

When the first external electronic device 102 is connected with the second external electronic device 103 by a request from the first external electronic device 102 as the event requiring connection with the first external electronic device 102 is triggered on the second external electronic device 103, in operation 607, the electronic device 101 may recognize release of the communication connection with the first external electronic device 102.

In an embodiment, the event requiring connection with the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In an embodiment, when the electronic device 101 is performing a call using the first external electronic device 102, is executing an application using the microphone built in the first external electronic device 102, or the first external electronic device 102 is outputting audio, the communication connection between the electronic device 101 and the first external electronic device 102 may be not released but maintained.

In an embodiment, when the electronic device 101 is playing media through a media application using the first external electronic device 102 or the electronic device 101 is connected to the first external electronic device 102 but is in an idle state, the first external electronic device 102 may perform communication connection with the second external electronic device 103 at the request of the second external electronic device 103, and the communication connection between the electronic device 101 and the first external electronic device 102 may be released.

In an embodiment, a connection operation between the second external electronic device 103 and the first external electronic device 102 when an event requiring connection with the first external electronic device 102 is triggered may be performed based on Table 1.

When communication between the first external electronic device 102 and the second external electronic device 103 is connected at the request of the second external electronic device 103, in operation 609, the electronic device 101 may receive a notification indicating that the communication connection between the second external electronic device 103 and the first external electronic device 102 is complete from the second external electronic device 103 and display, on the display, information indicating that the connection state of the first external electronic device 102 has been changed based on the information received from the second external electronic device 103.

In an embodiment, the electronic device 101 may display, on the display, the reason why the connection of the first external electronic device 102 has been changed (e.g., occurrence of an incoming/outgoing call on the second external electronic device 103 or execution of a media application on the second external electronic device 103), as the information indicating that the connection state has been changed.

In an embodiment, the electronic device 101 may display, on the display, an icon or menu requesting reconnection between the first external electronic device 102 and the electronic device 101 along with the information indicating that the connection state has been changed.

In operation 611, the electronic device 101 may identify whether an event for selecting, e.g., an icon or menu for requesting communication reconnection between the first external electronic device 102 and the electronic device 101 through the input means of the electronic device 101 is triggered.

In an embodiment, the event requiring reconnection with the first external electronic device 102 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, the electronic device 101 may perform communication reconnection by touching an icon or a menu for requesting communication reconnection with the first external electronic device 102 displayed on the screen of the electronic device 101.

In an embodiment, when the second external electronic device 103 is performing a call using the first external electronic device 102, the electronic device 101 may be configured not to perform communication reconnection even when the icon or menu for requesting communication reconnection with the first external electronic device 102 displayed on the screen of the electronic device 101 is touched.

If an event requiring communication reconnection is triggered, in operation 613, the electronic device 101 may perform various operations for communication reconnection with the first external electronic device 102 and, like in operation 601, broadcast an advertisement packet including reconnection information in the state of being reconnected with the first external electronic device 102 or transfer reconnection information with the first external electronic device 102 to the second external electronic device 103 based on P2P communication or Wi-Fi communication. According to an embodiment, the electronic device 101 may upload reconnection information with the first external electronic device 102 to the external server, and the second external electronic device 103 may receive the reconnection information through the external server. According to an embodiment, the electronic device 101 may display information indicating reconnection with the first external electronic device 102 on the display.

Figure 7:
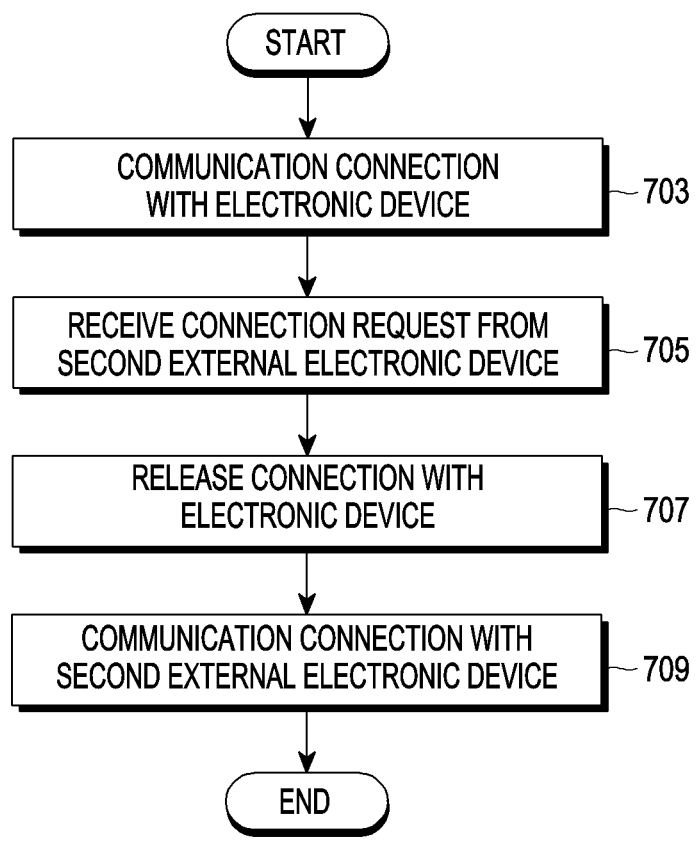
FIG. 7 is a flowchart illustrating an operation for a first external electronic device performing a short-range communication connection with an electronic device and a second external electronic device according to an embodiment of the disclosure.

FIG. 7 is a flowchart illustrating an operation for a first external electronic device performing a short-range communication connection with an electronic device and a second external electronic device according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled.

Referring to FIG. 7, in operation 703, the first external electronic device 102 may perform various operations for Bluetooth connection based on the Bluetooth standard, performing communication connection with the electronic device 101 based on the Bluetooth communication scheme. According to an embodiment, upon receiving an input signal for scanning nearby Bluetooth devices through the input means of the electronic device 101 in a state in which the Bluetooth function of the electronic device 101 and the first external electronic device 102 is enabled, the electronic device 101 may transmit an ID packet, and the first external electronic device 102 may receive the ID packet so that the electronic device 101 may recognize the first external electronic device 102. When the recognized first external electronic device 102 is displayed on the display of the electronic device 101, and the recognized first external electronic device 102 is selected through the input means of the electronic device 101, the pairing between the electronic device 101 and the first external electronic device 102 may be finally complete.

In an embodiment, in a state in which the electronic device 101 and the first external electronic device 102 are connected, an advertisement packet including connection information with the first external electronic device 102 may be broadcast to the second external electronic device 103 through the electronic device 101.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 based on the UUID while performing communication connection with the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server.

In another embodiment, the electronic device 101 may transmit the user account information, ID, connection state, and state information of the first external electronic device 102 to the second external electronic device 103 based on a device-to-device (D2D) communication scheme or a Wi-Fi communication scheme.

When an event requiring connection with the first external electronic device 102 is triggered on the second external electronic device 103, in operation 705, the first external electronic device 102 may receive the connection request from the second external electronic device 103.

In an embodiment, the event requiring connection with the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In an embodiment, when the electronic device 101 is performing a call using the first external electronic device 102, is executing an application using the microphone built in the first external electronic device 102, or the first external electronic device 102 is outputting audio, the communication connection between the electronic device 101 and the first external electronic device 102 may be not released but maintained.

A connection operation between the second external electronic device 103 and the first external electronic device 102 when an event requiring connection with the first external electronic device 102 is triggered on the second external electronic device 103 in each situation according to an embodiment may be performed based on Table 1.

In an embodiment, when the electronic device 101 is playing media through a media application using the first external electronic device 102 or the electronic device 101 is connected to the first external electronic device 102 but is in an idle state, in operation 707, the first external electronic device 102 may release communication connection between the electronic device 101 and the first external electronic device 102 at the request of the second external electronic device 103. In an embodiment, the first external electronic device 102 may release the SPP, HFP, or A2DP connection with the electronic device 101.

In operation 709, the first external electronic device 102 may perform communication connection with the second external electronic device 103. In an embodiment, the first external electronic device 102 may perform an SPP, HFP, or A2DP connection to the second external electronic device 103.

In an embodiment, the reason why the connection between the electronic device 101 and the first external electronic device 102 has been changed (e.g., occurrence of an incoming/outgoing call on the second external electronic device 103 or execution of a media application on the second external electronic device 103) may be displayed on the display of the electronic device 101.

In an embodiment, an event for selecting, e.g., an icon or menu for requesting communication reconnection between the first external electronic device 102 and the electronic device 101 may be triggered via the input means of the electronic device 101, the first external electronic device 102 may perform various operations for communication reconnection with the electronic device 101.

In an embodiment, the event requiring reconnection between the first external electronic device 102 and the electronic device 101 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, communication reconnection between the electronic device 101 and the first external electronic device 102 may be performed by touching an icon or a menu for requesting communication reconnection with the first external electronic device 102 displayed on the screen of the electronic device 101.

In an embodiment, when the second external electronic device 103 is performing a call using the first external electronic device 102, it may be configured not to perform communication reconnection even when the icon or menu for requesting communication reconnection with the first external electronic device 102 displayed on the screen of the electronic device 101 is touched.

A connection operation between the second external electronic device 103 and the first external electronic device 102 when an event requiring connection with the first external electronic device 102 is triggered on the second external electronic device 103 in each of various situations according to an embodiment may be performed based on Table 1.

According to an embodiment, the first external electronic device 102 reconnected with the electronic device 101 may release the communication connection with the second external electronic device 103. According to an embodiment, the electronic device 101 may display information indicating reconnection with the first external electronic device 102 on the display.

Figure 8:
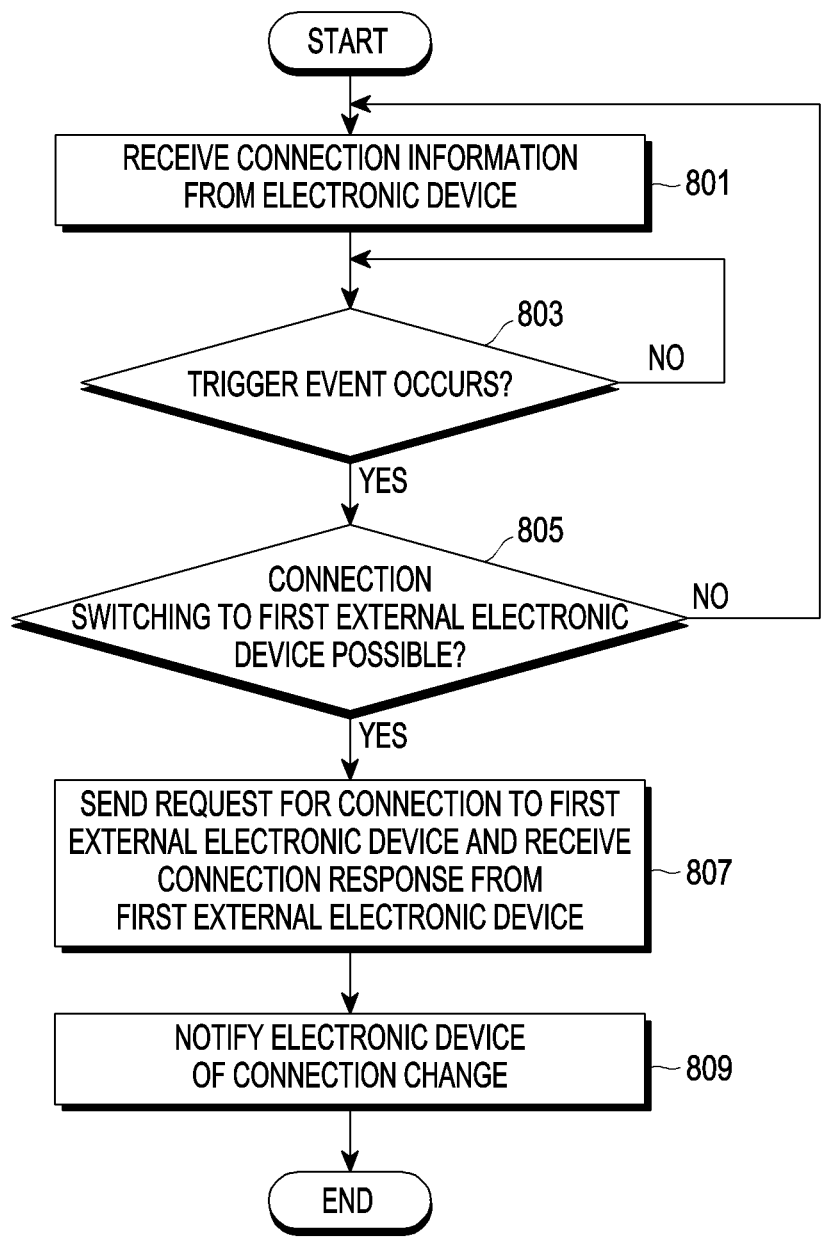
FIG. 8 is a flowchart illustrating an operation for a second external electronic device performing a short-range communication connection with an electronic device and a first external electronic device according to an embodiment of the disclosure.

FIG. 8 is a flowchart illustrating an operation for a second external electronic device performing a short-range communication connection with an electronic device and a first external electronic device according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled.

Referring to FIG. 8, in a state in which communication is connected between the electronic device 101 and the first external electronic device 102, in operation 801, the second external electronic device 103 may receive the advertisement packet including connection information between the electronic device 101 and the first external electronic device 102 and broadcast from the electronic device 101.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 while performing communication connection with the first external electronic device 102. In another embodiment, the first external electronic device 102 may transmit the user account information, ID, connection state, and state information of the first external electronic device 102 to an external server (not shown), and the electronic device 101 may receive the user account information, ID, connection state, and state information of the first external electronic device from the external server.

In an embodiment, the second external electronic device 103 may display, on the display, information indicating that the electronic device 101 and the first external electronic device 102 have been connected based on the connection information about the first external electronic device 102 received from the electronic device 101. In an embodiment, the second external electronic device 103 may display, on the display, information indicating that the electronic device 101 and the first external electronic device 102 have been connected based on the user account information registered in the server.

In operation 803, the second external electronic device 103 may identify whether an event requiring connection with the first external electronic device 102 is triggered.

In an embodiment, the event requiring connection between the second external electronic device 103 and the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In operation 805, the second external electronic device 103 may identify the connection state between the electronic device 101 and the first external electronic device 102 based on the information received from the electronic device 101 in operation 801 and determine whether it is possible to perform communication connection with the first external electronic device 102 based on the identified connection state.

In an embodiment, when the electronic device 101 is performing a call using the first external electronic device 102, is executing an application using the microphone built in the first external electronic device 102, or the first external electronic device 102 is outputting audio, the second external electronic device 103 may determine that communication connection with the first external electronic device 102 may not be performed. In an embodiment, the second external electronic device 103 may display, on the display of the second external electronic device 103, information indicating the result of determining that communication connection with the first external electronic device 102 may not be performed.

Table 1 may be referenced for a connection operation between the second external electronic device 103 and the first external electronic device 102 when an event requiring connection with the first external electronic device 102 is triggered on the second external electronic device 103 in each situation according to an embodiment.

When it is determined that the second external electronic device 103 is unable to perform communication connection with the first external electronic device 102, the communication connection between the electronic device 101 and the first external electronic device 102 may not be released but maintained, and the second external electronic device 103 may perform operation 801 again.

In an embodiment, when the electronic device 101 is playing media through a media application using the first external electronic device 102 or the electronic device 101 is connected to the first external electronic device 102 but is in an idle state, the second external electronic device 103 may determine that communication connection with the first external electronic device 102 may be performed.

When it is determined that the second external electronic device 103 is able to perform communication connection with the first external electronic device 102, in operation 807, the second external electronic device 103 may perform communication connection with the first external electronic device 102 by sending a request for communication connection to the first external electronic device 102 and receiving a communication connection response. In an embodiment, the second external electronic device 103 may send a request for SPP, HFP, or A2DP connection to the first external electronic device 102. In an embodiment, if communication is connected between the first external electronic device 102 and the second external electronic device 103, the communication connection between the electronic device 101 and the first external electronic device 102 may be released.

In an embodiment, the second external electronic device 103 may transmit a notification indicating that connection between the second external electronic device 103 and the first external electronic device 102 is to be performed to the electronic device 101 before transmitting a communication connection request to the first external electronic device 102.

In an embodiment, the second external electronic device 103 may transmit a notification indicating that the communication connection between the second external electronic device 103 and the first external electronic device 102 is complete to the electronic device 101 after communication between the first external electronic device 102 and the second external electronic device 102 is connected.

In an embodiment, connection change state information about the first external electronic device 102 may be displayed on the display of the electronic device 101 based on the notification transmitted from the second external electronic device 103 to the electronic device 101, in operation 809.

In an embodiment, the reason why the connection of the first external electronic device 102 has been changed (e.g., occurrence of an incoming/outgoing call on the second external electronic device 103 or execution of a media application on the second external electronic device 103), as the information indicating that the connection state has been changed, may be displayed on the display of the electronic device 101.

In an embodiment, an icon or menu requesting reconnection between the first external electronic device 102 and the electronic device 101 along with the information indicating that the connection state has been changed may be displayed on the display of the electronic device 101.

In an embodiment, when an event for selecting an icon or menu for requesting communication reconnection between the first external electronic device 102 and the electronic device 101 through the input means of the electronic device 101 is triggered, the electronic device 101 may perform various operations for communication reconnection with the first external electronic device 102, and the second external electronic device 103 may receive the advertisement packet including the connection information and broadcast from the electronic device 101 in the state of being connected with the first external electronic device 102, like in operation 801.

In an embodiment, the event requiring reconnection with the first external electronic device 102 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, communication reconnection may be performed by touching an icon or a menu for requesting communication reconnection with the first external electronic device 102 displayed on the screen of the electronic device 101.

In an embodiment, when the second external electronic device 103 is performing a call using the first external electronic device 102, it may be configured not to perform communication reconnection between the electronic device 101 and the first external electronic device 102 even when the icon or menu for requesting communication reconnection with the first external electronic device 102 displayed on the screen of the electronic device 101 is touched.

A connection operation between the second external electronic device 103 and the first external electronic device 102 when an event requiring connection with the first external electronic device 102 is triggered on the second external electronic device 103 in each of various situations according to an embodiment may be performed based on Table 1.

In an embodiment, in a case where the electronic device 101 is playing media through the media application using the first external electronic device 102, if the media application is executed by a user input on the second external electronic device 103, a voice recognition artificial intelligence application such as a voice assistance is played or an incoming/outgoing call is generated on the second external electronic device 103 so that the connection between the electronic device 101 and the first external electronic device 102 is released, and a connection between the first external electronic device 102 and the second external electronic device 103 is performed, the media playback on the electronic device 101 may be switched into a pause state and, if the media playback on the second external electronic device 103 or the voice recognition artificial intelligence application is terminated or incoming/outgoing call is terminated, the connection between the first external electronic device 102 and the second external electronic device 103 may be released, and communication may be reconnected between the electronic device 101 and the first external electronic device 102. In an embodiment, when the connection between the first external electronic device 102 and the second external electronic device 103 is released and the communication is reconnected between the electronic device 101 and the first external electronic device 102, media playback that has been paused on the electronic device 101 immediately before the connection between the first external electronic device 102 and the electronic device 101 is released may be re-executed.

A method for performing a short-range communication connection between the electronic device, first external electronic device, and second external electronic device when the first external electronic device 102 does not support multi-serial portion profile (SPP) connection has been described according to the embodiment of FIGS. 4A, 4B, and 5 to 8. Described below is a method for performing a short-range communication connection between the electronic device, first external electronic device, and second external electronic device when the first external electronic device 102 supports multi-SPP connection according to another embodiment.

In an embodiment, for Bluetooth communication, the electronic device 101, the first external electronic device 102, and the second external electronic device 103 may be compatible with Bluetooth profiles required to use a desired service. In an embodiment, the electronic device 101 and the second external electronic device 103 may connect to the first external electronic device 102 using an SPP, an HFP, or an A2DP among Bluetooth profiles.

In an embodiment, if the Bluetooth communication is connected between the first external electronic device 102 and the electronic device 101 or between the first external electronic device 102 and the second external electronic device 103, they may be connected through the SPP or additionally HFP or A2DP.

In an embodiment, when the first external electronic device 102 supports multi-SPP connection, the first external electronic device 102 may establish an SPP connection with the second external electronic device 103 while maintaining the SPP connection with the electronic device 101.

In an embodiment, as the first external electronic device 102 configures an SPP connection with the second external electronic device 103 in a state in which the first external electronic device 102 is connected with the electronic device 101 via SPP and HFP or A2DP, the second external electronic device 103 may quickly connect to the first external electronic device 102 when an HFP or A2Dp connection is required.

Figure 9:
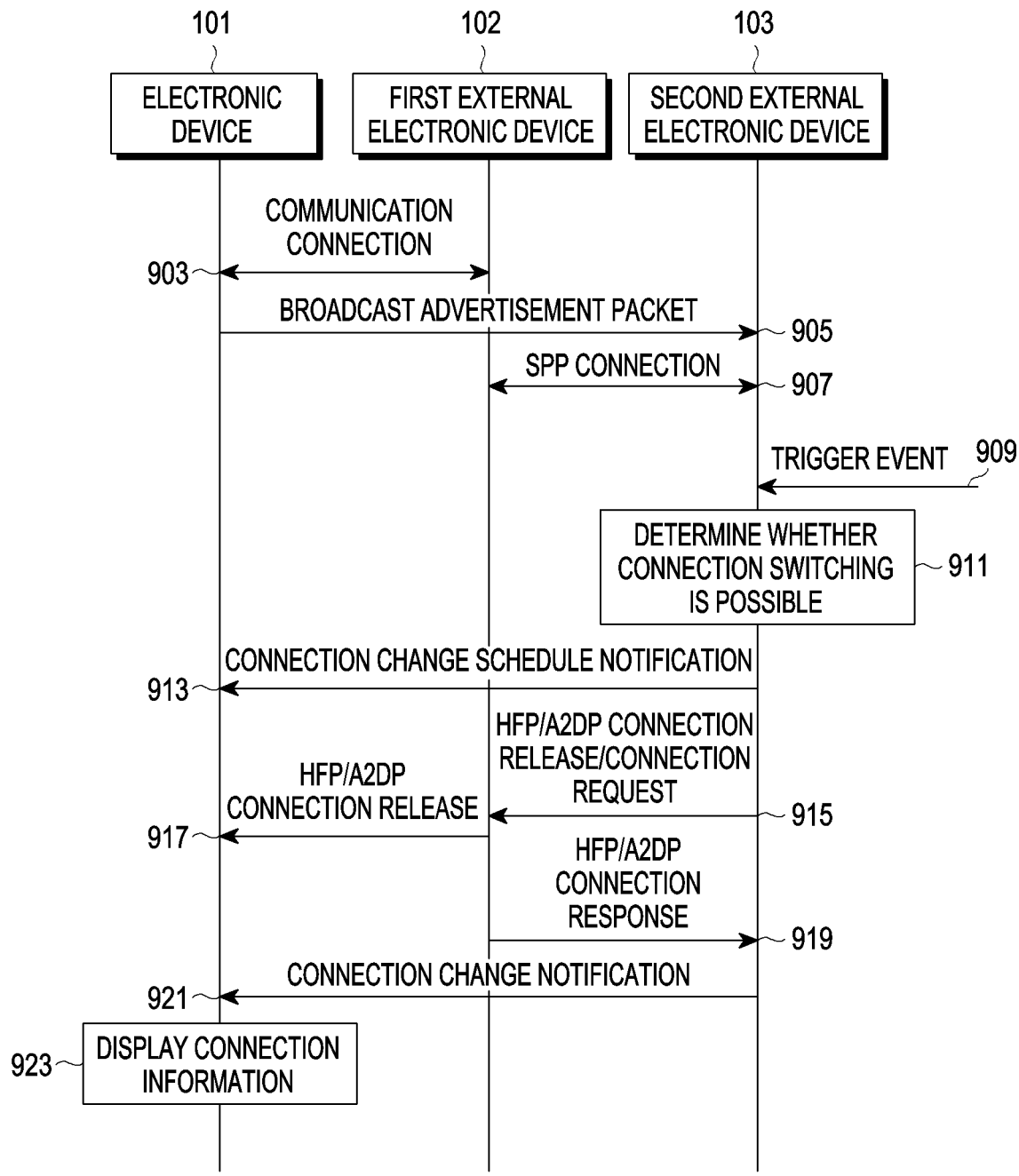
FIG. 9 is a view illustrating a short-range communication connection procedure between an electronic device and first and second external electronic devices according to an embodiment of the disclosure.

FIG. 9 is a view illustrating a short-range communication connection procedure between an electronic device and first and second external electronic devices according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In other words, one earphone may be connected to the electronic device 101 and the other earphone may be disconnected from the electronic device 101, or both the earphones may be connected to the electronic device 101. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled as shown in FIG. 4B. In an embodiment, the first external electronic device 102 may support multi-SPP connection.

Referring to FIG. 9, in operation 903, the electronic device 101 may perform various operations for Bluetooth connection based on the Bluetooth standard, performing communication connection with the first external electronic device 102 based on the Bluetooth communication scheme. In an embodiment, the electronic device 101 may be connected through SPP, HFP or A2DP. The SP, HFP, or A2DP connection process may follow the Bluetooth profile standard.

In an embodiment, the electronic device 101 may receive SPP connection information and wearing state information about the first external electronic device 102 after communication connection with the first external electronic device 102. According to an embodiment, the SPP connection information and wearing state information about the first external electronic device 102 may be received based on a pre-defined UUID.

In operation 905, the electronic device 101 may broadcast an advertisement packet including connection information about the first external electronic device 102 in a state of being connected to the first external electronic device 102, transferring connection information with the first external electronic device 102 to the second external electronic device 103.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 based on the UUID while performing communication connection with the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server. In another embodiment, the electronic device 101 may transmit the user account information, ID, connection state, and state information of the first external electronic device 102 to the second external electronic device 103 based on a D2D communication scheme or a Wi-Fi communication scheme.

In operation 907, the second external electronic device 103 may perform SPP connection with the first external electronic device 102 based on the connection information about the first external electronic device 102 received from the electronic device 101 or the external server. In an embodiment, the second external electronic device 103 may display, on the display, information indicating that the electronic device 101 and the first external electronic device 102 have been connected based on the user account information registered in the server.

In an embodiment, the second external electronic device 103 may display, on the display, information indicating that the electronic device 101 and the first external electronic device 102 have been connected based on the connection information received from the electronic device 101.

In operation 909, when an event requiring connection with the first external electronic device 102 is triggered on the second external electronic device 103, in operation 911, the second external electronic device 103 may identify the connection state between the electronic device 101 and the first external electronic device 102 based on the information received from the electronic device 101 in operation 405 and determine whether it is possible to perform communication connection with the first external electronic device 102 based on the identified connection state.

In an embodiment, the event requiring connection with the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In an embodiment, upon identifying that the electronic device 101 is performing a call using the first external electronic device 102, is executing an application using the microphone built in the first external electronic device 102, or the first external electronic device 102 is outputting audio, the second external electronic device 103 may determine that communication connection with the first external electronic device 102 may not be performed.

A connection operation between the second external electronic device 103 and the first external electronic device 102 when an event requiring connection with the first external electronic device 102 is triggered on the second external electronic device 103 in each situation according to an embodiment may be performed based on Table 1.

In an embodiment, the second external electronic device 103 may display, on the display of the second external electronic device 103, information indicating the result of determining that communication connection with the first external electronic device 102 may not be performed.

In an embodiment, upon identifying that the electronic device 101 is playing media through a media application using the first external electronic device 102 and the electronic device 101 is connected to the first external electronic device 102 but is in an idle state, the second external electronic device 103 may determine that communication connection with the first external electronic device 102 may be performed.

In operation 913, the second external electronic device 103, which determines that communication connection with the first external electronic device 102 may be performed, may notify the first external electronic device 102 to release connection with the electronic device 101. In an embodiment, the second external electronic device 103, which determines that communication connection with the first external electronic device 102 may be performed, may notify the electronic device 101, connected with the first external electronic device 102, that connection between the second external electronic device 103 and the first external electronic device 102 is to be performed.

In operation 915, the second external electronic device 103, which determines that communication connection with the first external electronic device 102 may be performed, may send a request for HFP or A2DPf connection to the first external electronic device 102 and send a request for releasing the HFP or A2DP connection between the first external electronic device 102 and the electronic device 101.

In operation 917, the first external electronic device 102, may receive the request for HFP or A2DP connection between the first external electronic device 102 and the second external electronic device 103 and a request for releasing the HFP or A2DP connection between the first external electronic device 102 and the electronic device 101 from the second external electronic device 103 and release the HFP or A2DP connection with the electronic device 101. In an embodiment, the first external electronic device 102 may maintain the SPP connection between the first external electronic device 102 and the electronic device 101. In an embodiment, if only the SPP connection between the first external electronic device 102 and the electronic device 101 is maintained, but the HFP or A2DP connection is released, the audio service through the first external electronic device 102 may not be provided.

In operation 919, the first external electronic device 102 may transmit an HFP or A2DP connection response to the second external electronic device 103 so that an HFP or A2DP connection may be established between the first external electronic device 102 and the second external electronic device 103. According to an embodiment, the first external electronic device 102 may notify the second external electronic device 103 that the HFP or A2DP connection with the first external electronic device 102 has been established through the communication connection response.

In operation 921, the second external electronic device 103 may notify the electronic device 101 that the HFP or A2DP connection between the second external electronic device 103 and the first external electronic device 102 has been complete. According to an embodiment, the second external electronic device 103 may notify the electronic device 101 that an HFP or A2DP connection with the first external electronic device 102 has been established.

In operation 923, in operation 921, the electronic device 101 may display, on the display, information indicating that the connection state of the first external electronic device 102 has been changed based on the information received from the second external electronic device 103 in operation 419. According to an embodiment, when the second external electronic device 103 establishes an HFP or A2DP connection with the first external electronic device 102, the electronic device 101 may display, on the display, information indicating that the connection with the first external electronic device 102 has been released.

In an embodiment, the electronic device 101 may display, on the display, the reason why the connection of the first external electronic device 102 has been changed (e.g., occurrence of an incoming/outgoing call on the second external electronic device 103 or execution of a media application on the second external electronic device 103), as the information indicating that the connection state has been changed.

In an embodiment, in a case where the electronic device 101 is playing media through the media application using the first external electronic device 102, if media is played through the media application by a user input on the second external electronic device 103, a voice recognition artificial intelligence application such as a voice assistance is played or an incoming/outgoing call is generated on the second external electronic device 103 so that the connection between the electronic device 101 and the first external electronic device 102 is released, and a connection between the first external electronic device 102 and the second external electronic device 103 is performed, the media playback on the electronic device 101 may be switched into a pause state and, if the media playback on the second external electronic device 103 or the voice recognition artificial intelligence application is terminated or incoming/outgoing call is terminated, the connection between the first external electronic device 102 and the second external electronic device 103 may be released, and communication may be reconnected between the electronic device 101 and the first external electronic device 102. In an embodiment, when the connection between the first external electronic device 102 and the second external electronic device 103 is released and the communication is reconnected between the electronic device 101 and the first external electronic device 102, media playback that has been paused on the electronic device 101 immediately before the connection between the first external electronic device 102 and the electronic device 101 is released may be re-executed.

Figure 10:
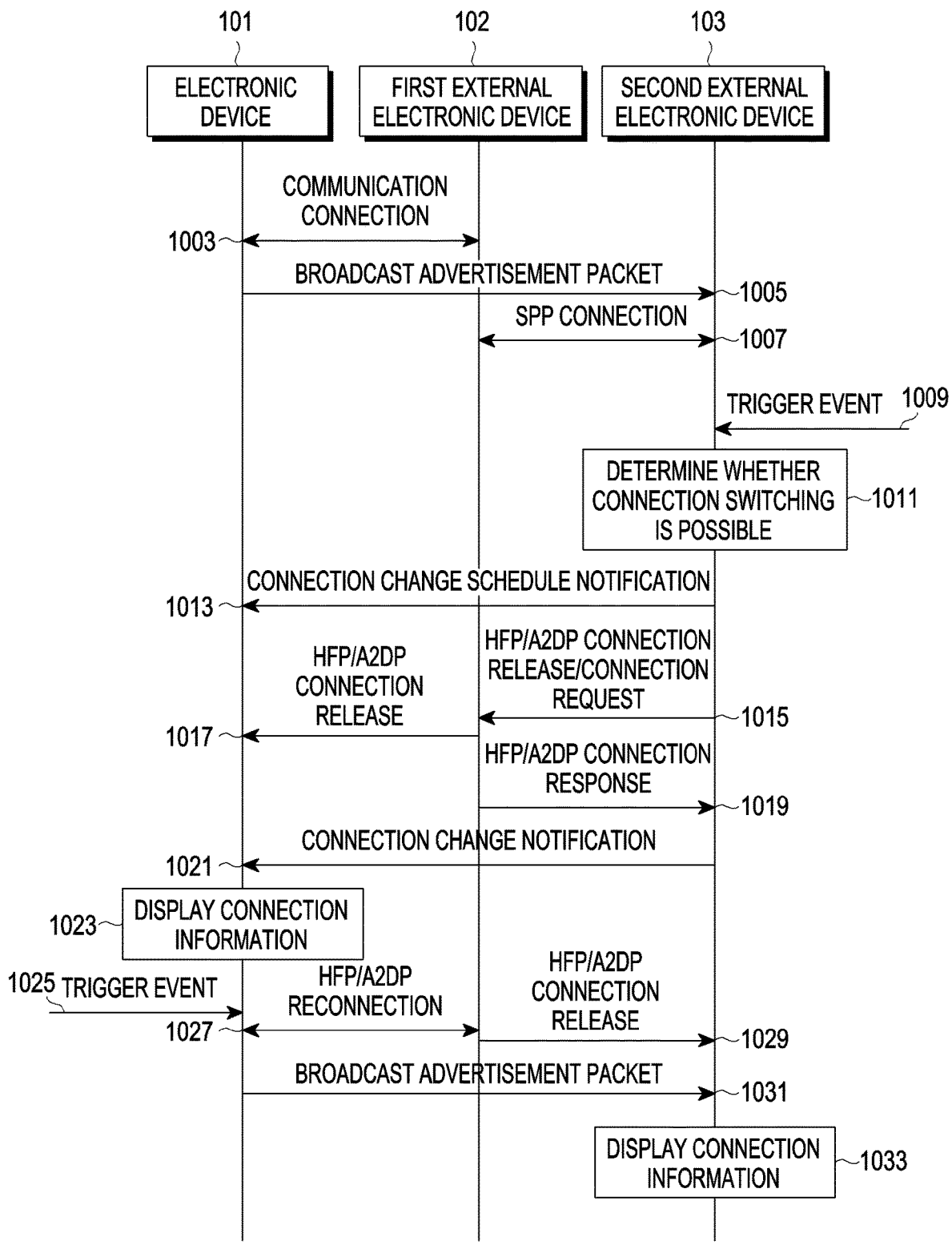
FIG. 10 is a view illustrating a short-range communication connection procedure between an electronic device and first and second external electronic devices according to an embodiment of the disclosure.

FIG. 10 is a view illustrating a short-range communication connection procedure between an electronic device and first and second external electronic devices according to an embodiment of the disclosure.

Referring to FIG. 10, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled. In an embodiment, the first external electronic device 102 may support multi-SPP connection.

Operations 1003, 1005, 1007, 1009, 1011, 1013, 1015, 1017, 1019, 1021, and 1023 of FIG. 10 are identical to operations 903, 905, 907, 909, 911, 913, 915, 917, 919, 921, and 923 of FIG. 9 and, thus, no repetitive description is given below.

In the state in which the connection between the electronic device 101 and the first external electronic device 102 is released and the connection between the first external electronic device 102 and the second external electronic device 103 is established through operations 1003, 1005, 1007, 1009, 1011, 1013, 1015, 1017, 1019, 1021, and 1023, when an event for requesting communication reconnection between the first external electronic device 102 and the electronic device 101 is triggered through the input means of the electronic device 101 in operation 1025, the electronic device 101 may perform various operations for reconnection via HFP or A2DP with the first external electronic device 102 in operation 1027.

In an embodiment, the event requiring reconnection with the first external electronic device 102 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, the electronic device 101 may perform communication reconnection by touching an icon or a menu for requesting communication reconnection with the first external electronic device 102 displayed on the screen of the electronic device 101.

In an embodiment, when the second external electronic device 103 is performing a call using the first external electronic device 102, the electronic device 101 may be configured not to perform communication reconnection even when the icon or menu for requesting communication reconnection with the first external electronic device 102 displayed on the screen of the electronic device 101 is touched.

A connection operation between the second external electronic device 103 and the first external electronic device 102 when an event requiring connection with the first external electronic device 102 is triggered on the second external electronic device 103 in each of various situations according to an embodiment may be performed based on Table 1.

The first external electronic device 102 reconnected with the electronic device 101 through HFP or A2DP may release the HFP or A2DP connection with the second external electronic device 103 in operation 1029. According to an embodiment, the electronic device 101 may display information indicating reconnection with the first external electronic device 102 on the display.

In operation 1031, like in operation 905, the electronic device 101 may broadcast an advertisement packet including reconnection information in a state of being reconnected through HFP or A2DP to the first external electronic device 102, transferring HFP or A2DP reconnection information with the first external electronic device 102 to the second external electronic device 103. In an embodiment, the connection information may be encrypted based on a hash function. The hash function may change at a specific period of time.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server. In another embodiment, the electronic device 101 may transmit the user account information, ID, connection state, and state information of the first external electronic device 102 to the second external electronic device 103 based on a D2D communication scheme or a Wi-Fi communication scheme.

In operation 1033, the second external electronic device 103 may display, on the display, information indicating that the electronic device 101 and the first external electronic device 102 have been reconnected through HFP or A2DP based on the connection information about the first external electronic device 102 received from the electronic device 101 or the external server.

Thereafter, when an event requesting connection with the first external electronic device 102 reoccurs on the second external electronic device 103 or the electronic device 101, operations 1009 to 1023 or operations 1025 to 1033 may be performed.

In an embodiment, in a case where the electronic device 101 is playing media through the media application using the first external electronic device 102, if the media application is executed by a user input on the second external electronic device 103, a voice recognition artificial intelligence application such as a voice assistance is played or an incoming/outgoing call is generated on the second external electronic device 103 so that the connection between the electronic device 101 and the first external electronic device 102 is released, and a connection between the first external electronic device 102 and the second external electronic device 103 is performed, the media playback on the electronic device 101 may be switched into a pause state and, if the media playback on the second external electronic device 103 or the voice recognition artificial intelligence application is terminated or incoming/outgoing call is terminated, the connection between the first external electronic device 102 and the second external electronic device 103 may be released, and communication may be reconnected between the electronic device 101 and the first external electronic device 102. In an embodiment, when the connection between the first external electronic device 102 and the second external electronic device 103 is released and the communication is reconnected between the electronic device 101 and the first external electronic device 102, media playback that has been paused on the electronic device 101 immediately before the connection between the first external electronic device 102 and the electronic device 101 is released may be re-executed.

In an embodiment, when there is a history in which the second external electronic device 103 was connected with a third external electronic device (not shown) supporting short-range communication after establishing an SPP connection with the first external electronic device 102 as in operation 907 of FIG. 9 and operation 1007 of FIG. 10, if an event requiring connection with the first external electronic device 102 is triggered on the second external electronic device 103 in operation 909 of FIG. 9 and operation 1009 of FIG. 10, the second external electronic device 103 may send a request for HFP or A2DP connection to the third external electronic device (not shown) with which it has the history of latest connection, not to the first external electronic device 102.

Figure 11:
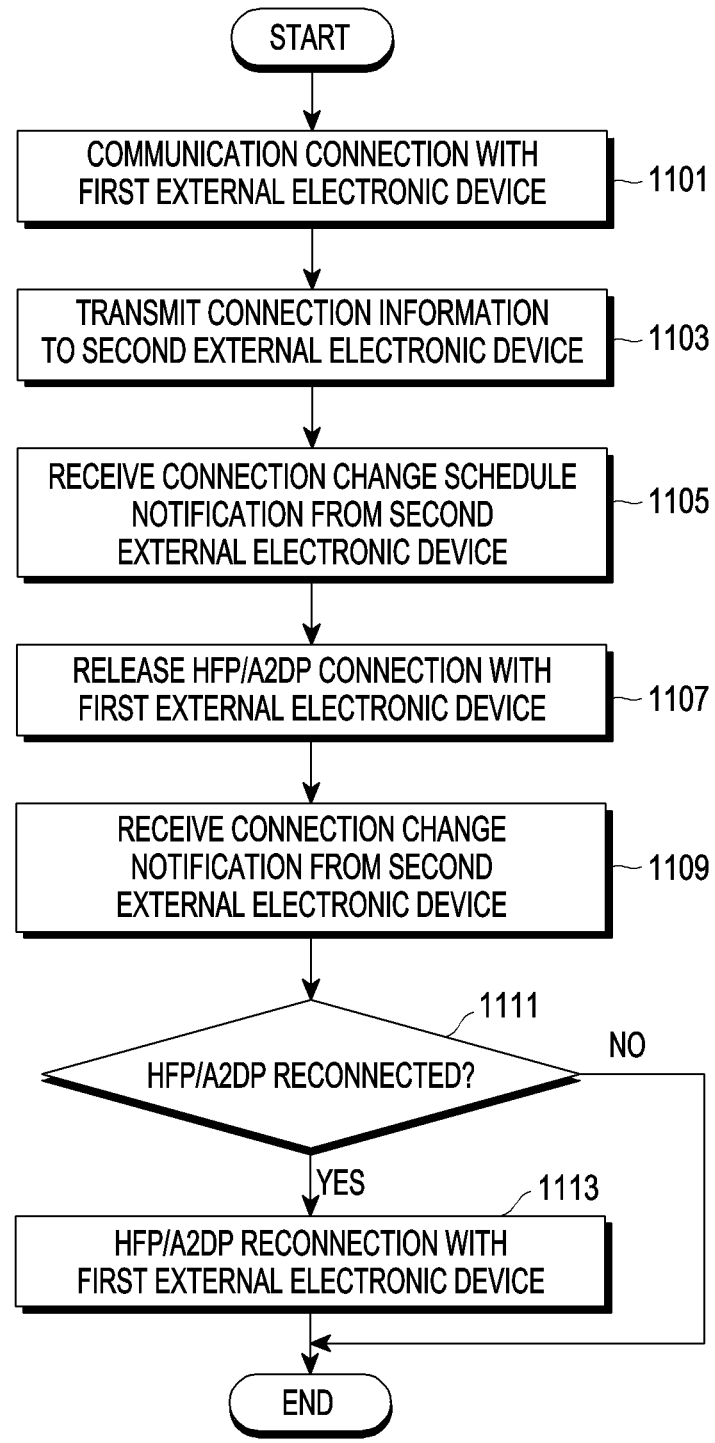
FIG. 11 is a flowchart illustrating an operation for an electronic device performing a short-range communication connection with a first external electronic device and a second external electronic device according to an embodiment of the disclosure.

FIG. 11 is a flowchart illustrating an operation for an electronic device performing a short-range communication connection with a first external electronic device and a second external electronic device according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled. In an embodiment, the first external electronic device 102 may support multi-SPP connection.

Referring to FIG. 11, in operation 1101, the electronic device 101 may perform various operations for Bluetooth connection based on the Bluetooth standard, performing communication connection with the first external electronic device 102 based on the Bluetooth communication scheme.

According to an embodiment, upon receiving an input signal for scanning nearby Bluetooth devices through the input means of the electronic device 101 in a state in which the Bluetooth function of the electronic device 101 and the first external electronic device 102 is enabled, the electronic device 101 may transmit an ID packet, and the first external electronic device 102 may receive the ID packet so that the electronic device 101 may recognize the first external electronic device 102. When the recognized first external electronic device 102 is displayed on the display of the electronic device 101, and the recognized first external electronic device 102 is selected through the input means of the electronic device 101, the pairing between the electronic device 101 and the first external electronic device 102 may be finally complete.

In an embodiment, for Bluetooth communication, the electronic device 101, the first external electronic device 102, and the second external electronic device 103 may be compatible with Bluetooth profiles required to use a desired service. In an embodiment, the electronic device 101 and the second external electronic device 103 each may connect to the first external electronic device 102 using an SPP, an HFP, or an A2DP among Bluetooth profiles. The SPP, HFP, or A2DP connection process may follow the Bluetooth profile standard. In an embodiment, if the Bluetooth communication is connected between the first external electronic device 102 and the electronic device 101 or between the first external electronic device 102 and the second external electronic device 103, they may be connected through the SPP or additionally HFP or A2DP.

In an embodiment, the electronic device 101 may receive SPP connection information and wearing state information about the first external electronic device 102 after communication connection with the first external electronic device 102. According to an embodiment, the SPP connection information and wearing state information about the first external electronic device 102 may be received based on a pre-defined UUID.

In operation 1103, the electronic device 101 may broadcast an advertisement packet including connection information about the first external electronic device 102 in a state of being connected to the first external electronic device 102, transferring connection information with the first external electronic device 102 to the second external electronic device 103. In an embodiment, the connection information may be encrypted based on a hash function. The hash function may change at a specific period of time.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 based on the UUID while performing communication connection with the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server. In another embodiment, the electronic device 101 may transmit the user account information, ID, connection state, and state information of the first external electronic device 102 to the second external electronic device 103 based on a D2D communication scheme or a Wi-Fi communication scheme.

In an embodiment, an SPP connection may be established between the second external electronic device 103 and the first external electronic device 102 based on the connection information received from the electronic device 101.

When an request for an HFP or A2DP connection is sent from the second external electronic device 103 to the first external electronic device 102 as an event requiring connection with the first external electronic device 102 is triggered on the second external electronic device 103, the electronic device 101 may receive a notification indicating that connection between the second external electronic device 103 and the first external electronic device 102 is to be performed from the first external electronic device 102, in operation 1105.

In an embodiment, the event requiring connection with the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In an embodiment, when the electronic device 101 is performing a call using the first external electronic device 102, is executing an application using the microphone built in the first external electronic device 102, or the first external electronic device 102 is outputting audio, the communication connection between the electronic device 101 and the first external electronic device 102 may be not released but maintained.

In an embodiment, when the electronic device 101 is playing media through a media application using the first external electronic device 102 or the electronic device 101 is connected to the first external electronic device 102 but is in an idle state, the first external electronic device 102 may perform communication connection with the second external electronic device 103 at the request of the second external electronic device 103, and the communication connection between the electronic device 101 and the first external electronic device 102 may be released.

In an embodiment, a connection operation between the second external electronic device 103 and the first external electronic device 102 when an event requiring connection with the first external electronic device 102 is triggered may be performed based on Table 1.

In operation 1107, the electronic device 101 may release the HFP or A2DP connection between the electronic device 101 and the first external electronic device 102. In an embodiment, the electronic device 101 may maintain the SPP connection between the first external electronic device 102 and the electronic device 101. In an embodiment, if only the SPP connection between the first external electronic device 102 and the electronic device 101 is maintained, but the HFP or A2DP connection is released, the audio service through the first external electronic device 102 may not be provided.

When the HFP or A2DP connection is established between the first external electronic device 102 and the second external electronic device 103 at the request of the second external electronic device 103, in operation 1109, the electronic device 101 may receive a notification indicating that the HFP or A2DP connection between the second external electronic device 103 and the first external electronic device 102 is complete from the second external electronic device 103 and display, on the display, information indicating that the connection state of the first external electronic device 102 has been changed based on the information received from the second external electronic device 103.

In an embodiment, the electronic device 101 may display, on the display, the reason why the connection of the first external electronic device 102 has been changed (e.g., occurrence of an incoming/outgoing call on the second external electronic device 103 or execution of a media application on the second external electronic device 103), as the information indicating that the connection state has been changed.

In an embodiment, the electronic device 101 may display, on the display, an icon or menu for reconnection between the first external electronic device 102 and the electronic device 101 along with the information indicating that the connection state has been changed.

In operation 1111, the electronic device 101 may identify whether an event for selecting, e.g., an icon or menu for requesting an HFP or A2DP reconnection between the first external electronic device 102 and the electronic device 101 through the input means of the electronic device 101 is triggered.

In an embodiment, the event requiring reconnection with the first external electronic device 102 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, the electronic device 101 may perform communication reconnection by touching an icon or a menu for requesting communication reconnection with the first external electronic device 102 displayed on the screen of the electronic device 101.

In an embodiment, when the second external electronic device 103 is performing a call using the first external electronic device 102, the electronic device 101 may be configured not to perform communication reconnection even when the icon or menu for requesting communication reconnection with the first external electronic device 102 displayed on the screen of the electronic device 101 is touched.

If an event requiring HFP or A2DP reconnection is triggered, in operation 1113, the electronic device 101 may perform various operations for HFP or A2DP reconnection with the first external electronic device 102 and, like in operation 1101, broadcast an advertisement packet including reconnection information in the state of being reconnected with the first external electronic device 102 or transfer HFP or A2DP reconnection information with the first external electronic device 102 to the second external electronic device 103 based on P2P communication or Wi-Fi communication. According to an embodiment, the electronic device 101 may upload reconnection information with the first external electronic device 102 to the external server, and the second external electronic device 103 may receive the reconnection information through the external server. According to an embodiment, the electronic device 101 may display information indicating reconnection with the first external electronic device 102 on the display.

Figure 12:
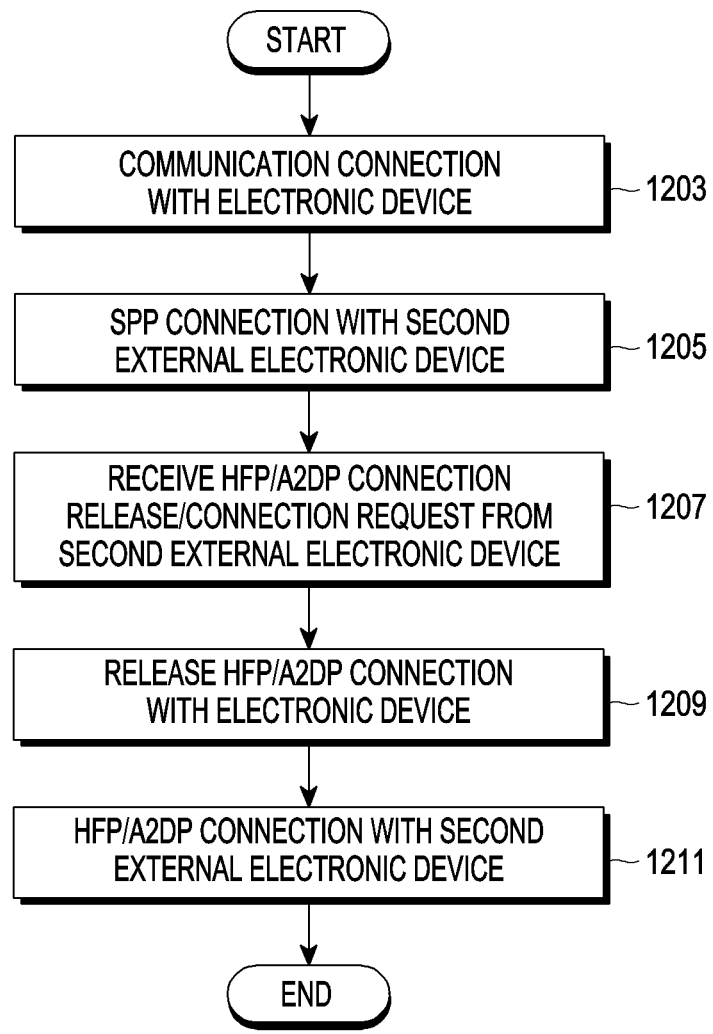
FIG. 12 is a flowchart illustrating an operation for a first external electronic device performing a short-range communication connection with an electronic device and a second external electronic device according to an embodiment of the disclosure.

FIG. 12 is a flowchart illustrating an operation for a first external electronic device performing a short-range communication connection with an electronic device and a second external electronic device according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled. In an embodiment, the first external electronic device 102 may support multi-SPP connection.

Referring to FIG. 12, in operation 1203, the first external electronic device 102 may perform various operations for Bluetooth connection based on the Bluetooth standard, performing communication connection with the electronic device 101 based on the Bluetooth communication scheme. In an embodiment, the first external electronic device 102 may be connected with the electronic device 101 through the SPP and HFP or A2DP. According to an embodiment, upon receiving an input signal for scanning nearby Bluetooth devices through the input means of the electronic device 101 in a state in which the Bluetooth function of the electronic device 101 and the first external electronic device 102 is enabled, the electronic device 101 may transmit an ID packet, and the first external electronic device 102 may receive the ID packet so that the electronic device 101 may recognize the first external electronic device 102. When the recognized first external electronic device 102 is displayed on the display of the electronic device 101, and the recognized first external electronic device 102 is selected through the input means of the electronic device 101, the pairing between the electronic device 101 and the first external electronic device 102 may be finally complete.

In an embodiment, in a state in which the electronic device 101 and the first external electronic device 102 are connected through the SPP and HFP or A2DP, an advertisement packet including connection information with the first external electronic device 102 may be broadcast to the second external electronic device 103 through the electronic device 101.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 based on the UUID while performing communication connection with the first external electronic device 102.

In another embodiment, the electronic device 101 may upload the user account information, ID, connection state, and state information of the first external electronic device 102 received from the first external electronic device 102 to an external server (not shown), and the second external electronic device 103 may receive the user account information, ID, connection state, and state information of the first external electronic device 102 from the external server. In another embodiment, the electronic device 101 may transmit the user account information, ID, connection state, and state information of the first external electronic device 102 to the second external electronic device 103 based on a device-to-device (D2D) communication scheme or a Wi-Fi communication scheme.

In operation 1205, the first external electronic device 102 may perform an SPP connection between the first external electronic device 102 and the second external electronic device 103 based on a request from the second external electronic device 103 and connection information received from an external server or broadcast from the electronic device 101 to the second external electronic device 103.

When an event requiring connection with the first external electronic device 102 is triggered on the second external electronic device 103, in operation 1207, the first external electronic device 102 may receive an HFP or A2DP connection request between the first external electronic device 102 and the second external electronic device 103 from the second external electronic device 103 and receive a request for releasing the HFP or A2DP connection between the first external electronic device 102 and the electronic device 101.

In an embodiment, the event requiring connection with the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In an embodiment, when the electronic device 101 is performing a call using the first external electronic device 102, is executing an application using the microphone built in the first external electronic device 102, or the first external electronic device 102 is outputting audio, the communication connection between the electronic device 101 and the first external electronic device 102 may be not released but maintained.

In an embodiment, when the electronic device 101 is playing media through a media application using the first external electronic device 102 or the electronic device 101 is connected to the first external electronic device 102 but is in an idle state, in operation 1209, the first external electronic device 102 may release HFP or A2DP connection between the electronic device 101 and the first external electronic device 102 at the request of the second external electronic device 103.

A connection operation between the second external electronic device 103 and the first external electronic device 102 when an event requiring connection with the first external electronic device 102 is triggered on the second external electronic device 103 in each situation according to an embodiment may be performed based on Table 1.

In operation 1211, the first external electronic device 102 may perform communication connection with the second external electronic device 103.

In an embodiment, the reason why the connection between the electronic device 101 and the first external electronic device 102 has been changed (e.g., occurrence of an incoming/outgoing call on the second external electronic device 103 or execution of a media application on the second external electronic device 103) may be displayed on the display of the electronic device 101.

In an embodiment, an event for selecting, e.g., an icon or menu for requesting HFP or A2DP reconnection between the first external electronic device 102 and the electronic device may be triggered via the input means of the electronic device 101, the first external electronic device 102 may perform various operations for HFP or A2DP reconnection with the external electronic device 102.

In an embodiment, the event requiring reconnection between the first external electronic device 102 and the electronic device 101 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, communication reconnection between the electronic device 101 and the first external electronic device 102 may be performed by touching an icon or a menu for requesting communication reconnection with the first external electronic device 102 displayed on the screen of the electronic device 101.

In an embodiment, when the second external electronic device 103 is performing a call using the first external electronic device 102, it may be configured not to perform communication reconnection even when the icon or menu for requesting communication reconnection with the first external electronic device 102 displayed on the screen of the electronic device 101 is touched.

A connection operation between the second external electronic device 103 and the first external electronic device 102 when an event requiring connection with the first external electronic device 102 is triggered on the second external electronic device 103 in each of various situations according to an embodiment may be performed based on Table 1.

According to an embodiment, the first external electronic device 102 reconnected with the electronic device 101 may release the communication connection with the second external electronic device 103. According to an embodiment, the electronic device 101 may display information indicating reconnection with the first external electronic device 102 on the display.

Figure 13:
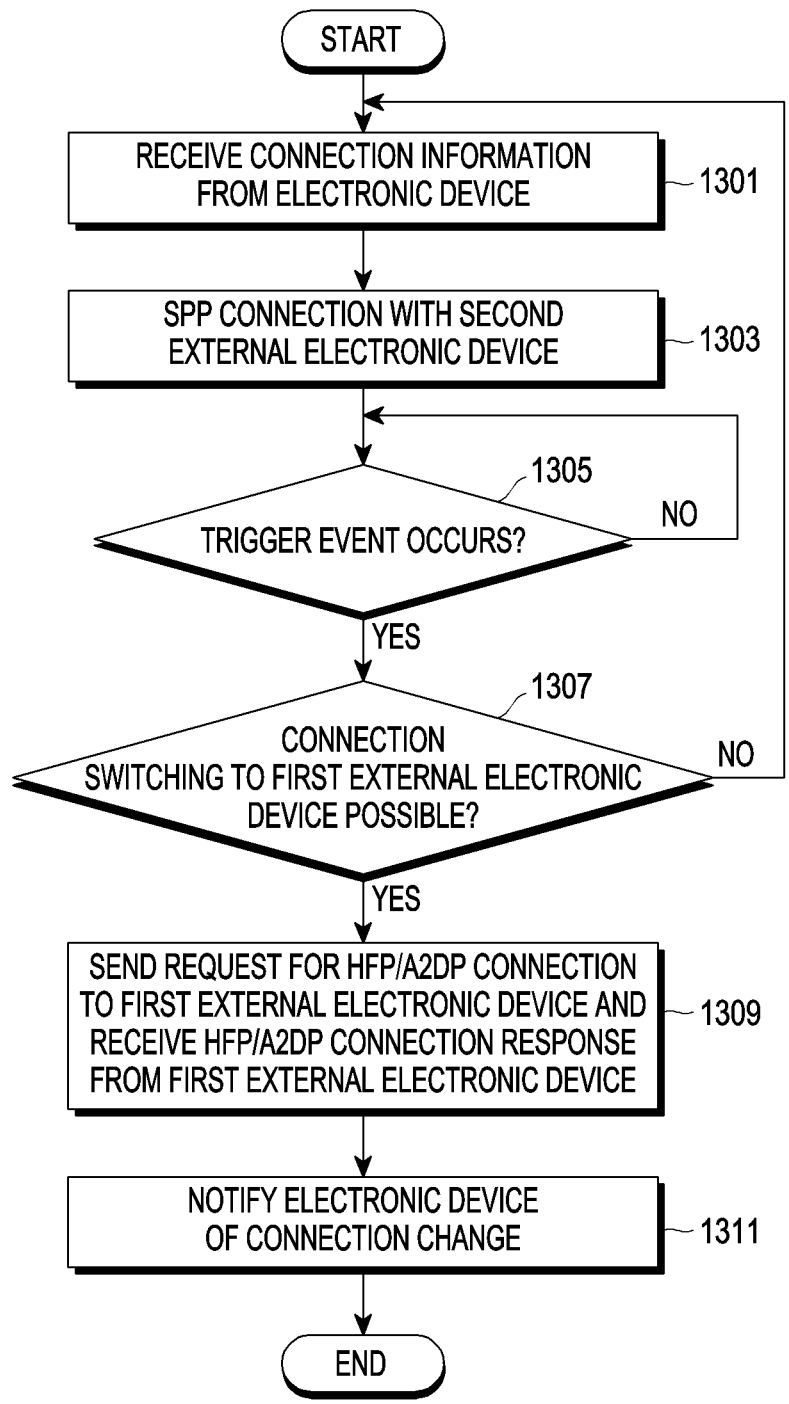
FIG. 13 is a flowchart illustrating an operation for a second external electronic device performing a short-range communication connection with an electronic device and a first external electronic device according to an embodiment of the disclosure.

FIG. 13 is a flowchart illustrating an operation for a second external electronic device performing a short-range communication connection with an electronic device and a first external electronic device according to an embodiment of the disclosure.

In an embodiment, the electronic device 101 or the second external electronic device 103 may be substantially the same as the electronic device 101 of FIG. 1 or the electronic device 200 of FIG. 2. In an embodiment, the first external electronic device 102 may be the same electronic device as the external electronic device 300 of FIG. 3. In an embodiment, the electronic device 101 may be a smartphone, the first external electronic device 102 may be a Bluetooth earphone, and the second external electronic device 103 may be a tablet PC. However, the disclosure is not limited thereto, and may be applied to devices that support short-distance communication, such as televisions (TVs) and personal computers (PCs), as well as various wearable devices such as smart watches. In an embodiment, when the first external electronic device 102 is a pair of Bluetooth earphones separable from each other, the user may be wearing at least one earphone. In an embodiment, the electronic device 101, the first external electronic device 102, and the second external electronic device 103 are in a state in which the Bluetooth function is enabled, and may be devices registered using the same user account. In an embodiment, the electronic device 101, the first external electronic device 102, and the second external electronic device 103 may be in a state in which the function of automatically switching communication connection between a plurality of electronic devices is enabled. In an embodiment, the first external electronic device 102 may support multi-SPP connection.

Referring to FIG. 13, in a state in which communication is connected between the electronic device 101 and the first external electronic device 102, in operation 1301, the second external electronic device 103 may receive the advertisement packet including connection information between the electronic device 101 and the first external electronic device 102 and broadcast from the electronic device 101. In an embodiment, the electronic device 101 and the first external electronic device 102 may be connected through the SPP and HFP or A2DP.

In an embodiment, information broadcast by the electronic device 101 may include user account information about the electronic device 101 and the first external electronic device 102, auto-switchable device IDs of the electronic device 101 and the first external electronic device 102, and state information (auto-switchable device state) about the electronic device 101 and the first external electronic device 102 (e.g., 'no paired device,' 'a device paired, but the headset disabled,' 'a device paired, and the headset enabled,' wearing state of the first external electronic device 102, and information indicating whether SPP connection is possible), state information (e.g., information about the currently running application, screen locked, screen unlocked, screen on, or screen off) about the electronic device 101, and state information (e.g., whether worn or operation mode (e.g., audio connection state or state on call, battery information) about the first external electronic device 102.

In an embodiment, the ID of the first external electronic device 102 may be generated based on the static address of the first external electronic device 102 and may be regenerated whenever another electronic device is newly connected.

In an embodiment, the user account information, ID, connection state, and state information of the first external electronic device 102 may be information that the electronic device 101 receives from the first external electronic device 102 while performing communication connection with the first external electronic device 102. In another embodiment, the first external electronic device 102 may transmit the user account information, ID, connection state, and state information of the first external electronic device 102 to an external server (not shown), and the electronic device 101 may receive the user account information, ID, connection state, and state information of the first external electronic device from the external server.

In an embodiment, the second external electronic device 103 may display, on the display, information indicating that the electronic device 101 and the first external electronic device 102 have been connected based on the connection information about the first external electronic device 102 received from the electronic device 101. In an embodiment, the second external electronic device 103 may display, on the display, information indicating that the electronic device 101 and the first external electronic device 102 have been connected based on the user account information registered in the server.

In operation 1303, the second external electronic device 103 may perform an SPP connection with the first external electronic device 102 based on the connection information received from the electronic device 101.

In an embodiment, the second external electronic device 103 may display, on the display, information indicating that the electronic device 101 and the first external electronic device 102 have been connected based on the connection information received from the electronic device 101.

In operation 1305, the second external electronic device 103 may identify whether an event requiring connection with the first external electronic device 102 is triggered.

In an embodiment, the event requiring connection between the second external electronic device 103 and the first external electronic device 102 may be, e.g., playing media through a media application by a user input on the second external electronic device 103, execution of a voice recognition artificial intelligence application such as a voice assistance, or generation of an incoming/outgoing call on the second external electronic device 103.

In operation 1307, the second external electronic device 103 may identify the connection state between the electronic device 101 and the first external electronic device 102 based on the information received from the electronic device 101 in operation 801 and determine whether it is possible to perform communication connection with the first external electronic device 102 based on the identified connection state.

In an embodiment, when the electronic device 101 is performing a call using the first external electronic device 102, is executing an application using the microphone built in the first external electronic device 102, or the first external electronic device 102 is outputting audio, the second external electronic device 103 may determine that communication connection with the first external electronic device 102 may not be performed. In an embodiment, the second external electronic device 103 may display, on the display of the second external electronic device 103, information indicating the result of determining that communication connection with the first external electronic device 102 may not be performed.

Table 1 may be referenced for a connection operation between the second external electronic device 103 and the first external electronic device 102 when an event requiring connection with the first external electronic device 102 is triggered on the second external electronic device 103 in each situation according to an embodiment.

When it is determined that the second external electronic device 103 is unable to perform communication connection with the first external electronic device 102, the communication connection between the electronic device 101 and the first external electronic device 102 may not be released but maintained, and the second external electronic device 103 may perform operation 1301 again.

In an embodiment, when the electronic device 101 is playing media through a media application using the first external electronic device 102 or the electronic device 101 is connected to the first external electronic device 102 but is in an idle state, the second external electronic device 103 may determine that communication connection with the first external electronic device 102 may be performed.

In an embodiment, the second external electronic device 103, which determines that communication connection with the first external electronic device 102 may be performed, may notify the electronic device 101, connected with the first external electronic device 102, that connection between the second external electronic device 103 and the first external electronic device 102 is to be performed.

Upon determining that the second external electronic device 103 is able to perform communication connection with the first external electronic device 102, in operation 1309, the second external electronic device 103 may send a request for HFP or A2DP connection to the first external electronic device 102 and a request for releasing the HFP or A2DP connection between the first external electronic device 102 and the electronic device 101, and the first external electronic device 102 may establish an HFP or A2DP connection with the second external electronic device 103 by receiving an HFP or A2DP connection response. If the HFP or A2DP connection is connected between the first external electronic device 102 and the second external electronic device 103, the HFP or A2DP connection between the electronic device 101 and the first external electronic device 102 may be released. In an embodiment, the SPP connection between the first external electronic device 102 and the electronic device 101 may be maintained.

In an embodiment, the second external electronic device 103 may transmit a notification indicating that HFP or A2DP connection between the second external electronic device 103 and the first external electronic device 102 is to be performed to the electronic device 101 before transmitting an HFP or A2DP connection request to the first external electronic device 102.

In an embodiment, the second external electronic device 103 may transmit a notification indicating that the HFP or A2DP connection between the second external electronic device 103 and the first external electronic device 102 is complete to the electronic device 101 after HFP or A2DP connection between the first external electronic device 102 and the second external electronic device 103 is connected.

In an embodiment, connection change state information about the first external electronic device 102 may be displayed on the display of the electronic device 101 based on the notification transmitted from the second external electronic device 103 to the electronic device 101, in operation 1311.

In an embodiment, the reason why the connection of the first external electronic device 102 has been changed (e.g., occurrence of an incoming/outgoing call on the second external electronic device 103 or execution of a media application on the second external electronic device 103), as the information indicating that the connection state has been changed, may be displayed on the display of the electronic device 101.

In an embodiment, an icon or menu requesting HFP or A2DP reconnection between the first external electronic device 102 and the electronic device 101 along with the information indicating that the connection state has been changed may be displayed on the display of the electronic device 101.

In an embodiment, when an event for selecting an icon or menu for requesting communication reconnection between the first external electronic device 102 and the electronic device 101 through the input means of the electronic device 101 is triggered, the electronic device 101 may perform various operations for HFP or A2DP reconnection with the first external electronic device 102, and the second external electronic device 103 may receive the advertisement packet including the connection information and broadcast from the electronic device 101 in the state of being connected with the first external electronic device 102, like in operation 801.

In an embodiment, the event requiring reconnection with the first external electronic device 102 may be, e.g., playing media through a media application by a user input on the electronic device 101, execution of a voice recognition artificial intelligence application such as a voice assistance, or generation of an incoming/outgoing call on the electronic device 101.

According to an embodiment, even when it is identified that the second external electronic device 103 is executing an application using the microphone built in the first external electronic device 102 or is outputting audio using the speaker of the first external electronic device 102, communication reconnection may be performed by touching an icon or a menu for requesting communication reconnection with the first external electronic device 102 displayed on the screen of the electronic device 101.

In an embodiment, when the second external electronic device 103 is performing a call using the first external electronic device 102, it may be configured not to perform communication reconnection between the electronic device 101 and the first external electronic device 102 even when the icon or menu for requesting communication reconnection with the first external electronic device 102 displayed on the screen of the electronic device 101 is touched.

A connection operation between the second external electronic device 103 and the first external electronic device 102 when an event requiring connection with the first external electronic device 102 is triggered on the second external electronic device 103 in each of various situations according to an embodiment may be performed based on Table 1.

In an embodiment, in a case where the electronic device 101 is playing media through the media application using the first external electronic device 102, if the media application is executed by a user input on the second external electronic device 103, a voice recognition artificial intelligence application such as a voice assistance is played or an incoming/outgoing call is generated on the second external electronic device 103 so that the HFP or A2DP connection between the electronic device 101 and the first external electronic device 102 is released, and an HFP or A2DP connection between the first external electronic device 102 and the second external electronic device 103 is performed, the media playback on the electronic device 101 may be switched into a pause state and, if the media playback on the second external electronic device 103 or the voice recognition artificial intelligence application is terminated or incoming/outgoing call is terminated, the HFP or A2DP connection between the first external electronic device 102 and the second external electronic device 103 may be released, and the HFP or A2DP may be reconnected between the electronic device 101 and the first external electronic device 102. In an embodiment, when the HFP or A2DP connection between the first external electronic device 102 and the second external electronic device 103 is released and the HFP or A2DP is reconnected between the electronic device 101 and the first external electronic device 102, media playback that has been paused on the electronic device 101 immediately before the HFP or A2DP connection between the first external electronic device 102 and the electronic device 101 is released may be re-executed.

Figure 14A:
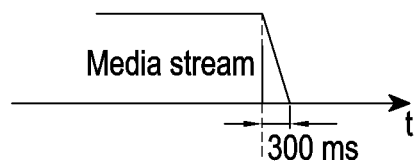
FIGS. 14A, 14B, and 14C are views illustrating a media fade-in/fade-out effect when an electronic device performs an automatic switching function according to various embodiments of the disclosure.
Figure 14B:
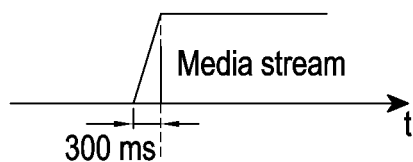
Figure 14C:
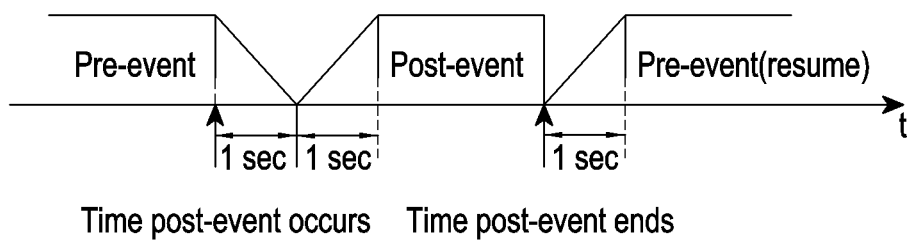

FIGS. 14A, 14B, and 14C are views illustrating a media fade-in/fade-out effect when an electronic device performs an automatic switching function according to various embodiments of the disclosure.

Referring to FIGS. 14A to 14C, when the connection between the first external electronic device 102 and the electronic device 101 is released, and connection between the first external electronic device 102 and the second external electronic device 103 is performed as an event requiring connection with the first external electronic device 102 is triggered on the second external electronic device 103 in a state in which media is being played on the electronic device 101 connected with the first external electronic device 102, the sound of the media played on the electronic device 101 may fade out, and the sound which is generated by an event triggered on the second external electronic device 103 may fade in.

According to an embodiment, the time (e.g., is in the case of FIG. 14B) when the sound fades in/fades out when the connection with the first external electronic device 102 is automatically switched from the electronic device 101 to the second external electronic device 103 by an event triggered on the second external electronic device 103 may be set to be longer than the time (e.g., 300 ms in the case of FIGS. 14A and 14B) when the sound fades out/fades in when the connection between the electronic device 101 and the first external electronic device 102 is forced to be disconnected by a user input on the second external electronic device 103, and connection between the first external electronic device 102 and the second external electronic device 103 is performed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
  a short-range communication circuit; and
  at least one processor functionally connected with the short-range communication circuit, wherein the at least one processor is configured to:
    perform a first communication connection with a first external electronic device through the short-range communication circuit,
    transmit first information associated with the first communication connection to a second external electronic device through the short-range communication circuit,
    when an event requiring a second communication connection between the second external electronic device and the first external electronic device occurs on the second external electronic device, receive second information indicating that the second communication connection is to be performed from the second external electronic device through the short-range communication circuit, and
    release the first communication connection through the short-range communication circuit.

2. The electronic device of claim 1, wherein the at least one processor is further configured to receive information indicating that the second communication connection is complete from the second external electronic device through the short-range communication circuit after the first communication connection is released.

3. The electronic device of claim 1, wherein the at least one processor is further configured to display, on a display of the electronic device, information indicating that the first communication connection is released or information indicating that the second communication connection is complete or a menu for requesting reconnection of the first communication connection after the first communication connection is released.

4. The electronic device of claim 1, wherein the at least one processor is further configured to:
  perform the first communication connection through the short-range communication circuit based on connections of at least two profiles; and
  release the first communication connection by releasing a connection of at least one profile among the at least two profiles through the short-range communication circuit.

5. The electronic device of claim 4,
  wherein the at least two profiles include a serial port profile (SPP) and at least one of a hands free profile (HFP) or an advanced audio distribution profile (A2DP), and
  wherein the at least one profile includes at least one of the HFP or the A2DP.

6. The electronic device of claim 1,
  wherein the first information is transmitted to the second external electronic device through an external server, and
  wherein the first information includes:
    state information about the electronic device,
    state information about the first external electronic device, and
    identification information about the first external electronic device.

7. The electronic device of claim 1, wherein the electronic device, the first external electronic device, and the second external electronic device are registered using the same user account.

8. An electronic device, comprising:
  a short-range communication circuit; and
  at least one processor functionally connected with the short-range communication circuit, wherein the at least one processor is configured to:
    perform a first communication connection with a first external electronic device through the short-range communication circuit,
    when an event requiring a second communication connection between a second external electronic device and the electronic device occurs on the second external electronic device in a state in which the first communication connection is connected, receive a request for the second communication connection from the second external electronic device through the short-range communication circuit, and
    release the first communication connection and perform the second communication connection through the short-range communication circuit based on the request for the second communication connection.

9. The electronic device of claim 8, wherein the at least one processor is further configured to:
  perform the first communication connection through the short-range communication circuit based on connections of at least two profiles; and
  release the first communication connection by releasing a connection of at least one profile among the at least two profiles through the short-range communication circuit.

10. The electronic device of claim 9, wherein the at least one processor is further configured to perform a connection of one profile among the at least two profiles between the second external electronic device and the electronic device based on a request from the second external electronic device before the event occurs, in a state in which the first communication connection is connected.

11. The electronic device of claim 10,
  wherein the at least two profiles include a serial port profile (SPP) and at least one of a hands free profile (HFP) or an advanced audio distribution profile (A2DP),
  wherein the at least one profile includes at least one of the HFP or the A2DP, and
  wherein the one profile is the SPP.

12. The electronic device of claim 8, wherein the at least one processor is further configured to transmit state information about the electronic device and identification information about the electronic device to the first external electronic device when performing the first communication connection through the short-range communication circuit.

13. The electronic device of claim 8, wherein the at least one processor is further configured to receive a request for releasing the second communication connection, along with the request for the second communication connection, from the second external electronic device through the short-range communication circuit.

14. The electronic device of claim 8, wherein the electronic device, the first external electronic device, and the second external electronic device are registered using the same user account.

15. An electronic device, comprising:
a short-range communication circuit; and
at least one processor functionally connected with the short-range communication circuit, wherein the at least one processor is configured to:
receive first information associated with a first communication connection between a first external electronic device and a second external electronic device from the second external electronic device connected with the first external electronic device through the short-range communication circuit,
when an event requiring a second communication connection to the first external electronic device occurs, transmit a request for releasing the first communication connection and a request for the second communication connection to the first external electronic device through the short-range communication circuit and transmit second information indicating that the second communication connection is to be performed to the second external electronic device, and
perform the second communication connection based on the first information through the short-range communication circuit.

16. The electronic device of claim 15, wherein the at least one processor is further configured to transmit information indicating that the second communication connection is complete to the second external electronic device through the short-range communication circuit after the second communication connection is completed.

17. The electronic device of claim 15, wherein the first information is received from the second external electronic device through an external server,
wherein the first information includes:
state information about the second external electronic device,
state information about the first external electronic device, and
identification information about the first external electronic device.

18. The electronic device of claim 15, wherein the first communication connection is performed based on connections of at least two profiles,
wherein the first communication connection is released by releasing a connection of at least one profile among the at least two profiles, and
wherein the at least one processor is further configured to request for a connection of one profile of the at least two profiles to the first external electronic device through the short-range communication circuit before the event occurs in a state in which the first communication connection is connected.

19. The electronic device of claim 18,
wherein the at least two profiles include a serial port profile (SPP) and at least one of a hands free profile (HFP) or an advanced audio distribution profile (A2DP),
wherein the at least one profile includes at least one of the HFP or the A2DP, and
wherein the one profile is the SPP.

20. The electronic device of claim 15, wherein the electronic device, the first external electronic device, and the second external electronic device are registered using the same user account.

* * * * *